(12) United States Patent
Morimoto

(10) Patent No.: US 7,174,793 B2
(45) Date of Patent: Feb. 13, 2007

(54) SENSOR SHEET

(75) Inventor: Hideo Morimoto, Yamatokooriyama (JP)

(73) Assignee: Nitta Corporation (JP)

( * ) Notice: Subject to any disclaimer, the term of this patent is extended or adjusted under 35 U.S.C. 154(b) by 0 days.

(21) Appl. No.: 10/665,278

(22) Filed: Sep. 19, 2003

(65) Prior Publication Data

US 2004/0055396 A1 Mar. 25, 2004

(30) Foreign Application Priority Data

Sep. 24, 2002 (JP) .............................. 2002-277624

(51) Int. Cl.
*G01L 1/22* (2006.01)

(52) U.S. Cl. .............................................. 73/862.045

(58) Field of Classification Search ............ 73/862.045, 73/862.04, 862.046, 862.043, 514.32; 324/686, 324/681; 438/50
See application file for complete search history.

(56) References Cited

U.S. PATENT DOCUMENTS

| | | | |
|---|---|---|---|
| 5,010,772 A * | 4/1991 | Bourland et al. ...... | 73/862.046 |
| 5,392,658 A * | 2/1995 | Okada .................... | 73/862.043 |
| 5,869,791 A * | 2/1999 | Young ..................... | 178/20.01 |
| 6,248,655 B1 * | 6/2001 | Machida et al. ........... | 438/597 |
| 6,373,265 B1 | 4/2002 | Morimoto et al. .......... | 324/686 |
| 6,504,385 B2 * | 1/2003 | Hartwell et al. ............ | 324/662 |
| 6,518,083 B2 * | 2/2003 | Sato et al. ..................... | 438/50 |
| 6,640,642 B1 * | 11/2003 | Onose et al. .................. | 73/718 |
| 6,714,666 B1 * | 3/2004 | Morimura et al. .......... | 382/124 |
| 6,727,561 B2 * | 4/2004 | Sato et al. .................. | 257/414 |
| 6,809,529 B2 * | 10/2004 | Okada et al. ............... | 324/681 |
| 6,826,968 B2 * | 12/2004 | Manaresi et al. ....... | 73/862.046 |

FOREIGN PATENT DOCUMENTS

| | | |
|---|---|---|
| JP | 6-347350 | 12/1994 |
| JP | 2000-275123 | 10/2000 |
| JP | 2002-131149 | 5/2002 |

OTHER PUBLICATIONS

Japanese Office Action dated Nov. 17, 2006 for Corresponding Application No. 2002-277624 (2 pages).
English Translation of Japanese Office Action dated Nov. 17, 2006 for Corresponding Application No. 2002-277624 (2 pages).

* cited by examiner

*Primary Examiner*—Michael Cygan
*Assistant Examiner*—Octavia Davis
(74) *Attorney, Agent, or Firm*—Osha Liang LLP

(57) ABSTRACT

In a sensor sheet of the present invention, a large number of sensor cells, each having capacitance element electrodes corresponding to an X-axis direction, a Y-axis direction and a Z-axis direction and a displacement electrode arranged to form capacitance elements between the capacitance element electrodes and the displacement electrode, are arranged in matrix. This arrangement enables measurement of a distribution of three-dimensional components of the force applied from outside over the overall sensor sheet on the basis of the components of force detected in each of the large number of sensor cells.

9 Claims, 16 Drawing Sheets (a)

(b)

SENSOR SHEET

BACKGROUND OF THE INVENTION

1. Field of the Invention

The present invention relates to sensor sheet suitably used for measuring distribution of force applied from outside.

2. Description of the Related Art

Sensor sheet which is capable of measuring distribution of force applied from outside is in use for analysis of a person's walking manner, for example. In general, the sensor sheet comprises a PET film on which a swath of pressure-sensitive resistance ink is printed along a longitudinal direction thereof and a PET film on which a swath of pressure-sensitive resistance ink is printed along a horizontal direction thereof (a direction orthogonal to the longitudinal direction) which are laminated so that the respective pressure-sensitive resistance inks are intersected with each other. In this sensor sheet, when a force is applied to the sensor sheet from outside, the sensor sheet changes in contact resistance between the two PET films at the force-applied place. By detecting temporal changes of magnitude of the contact resistance along lines of pressure-sensitive resistance ink, distribution of the force (pressure) applied from outside can be measured.

However, this sensor sheet can only measure a distribution of a one-dimensional force applied from outside for a vertical direction of the sensor sheet. When a force of an oblique direction (any direction but a vertical direction) with respect to the sensor sheet is applied to the sensor sheet, the sensor sheet can only measure distribution of force corresponding to a component of the force of the oblique direction acting in a vertical direction to the sensor sheet and having magnitude for the vertical direction. Thus, the conventional sensor sheet cannot make a thorough analysis of distribution of force applied from outside in different directions.

SUMMARY OF THE INVENTION

It is an object of the invention to provide a sensor sheet capable of measuring distribution of multidimensional force.

In accordance with the first aspect of the present invention, there is provided a sensor sheet wherein a plurality of sensors which are each capable of recognizing multiple different direction components of a force applied from outside are arranged on substantially the same plane.

In the sensor sheet of the present invention, the sensor may comprise a multiple of first electrodes corresponding to the multiple directions, and a second electrode which is arranged to be opposite to the first electrodes to form capacitance elements between the first electrodes and the second electrode and which is displaceable in a direction of being close to the first electrodes with the force applied from outside, and the sensor may be a capacitance type sensor that is capable of recognizing the force applied from outside on the basis of detection of changes in capacitance values of the capacitance elements caused by changes in intervals between the first electrodes and the second electrode by using a signal input to the first electrode.

In the sensor sheet of the present invention, the sensor may comprise a multiple of first electrodes corresponding to the multiple directions, a second electrode which is arranged to be opposite to the first electrodes and is displaceable in a direction of being close to the first electrodes with the force applied from outside, and a pressure-sensitive resistance member arranged between the first electrodes and the second electrode, and the sensor may be a resistance type sensor that is capable of recognizing the force applied from outside on the basis of detection of changes in resistance values between the first electrodes and the second electrode.

According to this construction, since each of the sensors can recognize the multiple direction components of the force applied from outside, the entire sensor sheet can measure a distribution of a multidimensional force, including not only a component of force vertical to the detecting place but also a component of force of different direction. This can allow a detailed analysis of the force applied to the sensor sheet.

The sensor sheet of the present invention may further comprise a third electrode arranged to be adjacent to the first electrodes, wherein the second electrode may be kept in an insulating state, and the third electrode is connected to ground, and wherein the second electrode and the third electrode may arranged so that when a force is applied from outside to the sensor, the second electrode and the third electrode are contactable with each other. According to this construction, when no force is applied to the sensor from outside, the second electrode is put in an insulated state and accordingly no voltage is applied to the capacitance elements formed between the first electrodes and the second electrode. Due to this, a quantity of electric charges stored in the capacitance elements are so small that it may be ignored, so that the output signals from the sensor are stably kept at a certain magnitude. On the other hand, when a force is applied to the sensor from outside, the second electrode is brought into contact with the third electrode connected to ground, so that voltage is applied to the capacitance elements. Due to this, the quantity of electric charges stored in the capacitance elements increase sharply, so that the output signals from the sensor vary significantly in accordance with the variation of the capacitance values of the capacitance elements. Thus, the quantity of electric charges stored in the capacitance elements before the force is applied to the sensor from outside and the quantity of electric charges stored in the capacitance elements after the application of the force to the sensor are both so small that they may be ignored, as compared with while the force is being applied to the sensor from outside. Therefore, even when the second electrode is out of position from its initial position, the output signals corresponding to the respective capacitance elements of the sensor (from the respective capacitance element electrodes) before the force is applied to the sensor from outside are substantially the same as those after the application of the force. Therefore, the output signals corresponding to the capacitance elements can be reduced in hysteresis.

Also, since the second electrode and the third electrode serve as the switch to take a contact position at which they are in contact with each other or a non-contact position, when the second electrode of the sensor to which no force is being applied from outside is displaced slightly (to an extent that will not bring the second electrode of the sensor and the third electrode into contact with each other) by a force applied from outside to other sensor adjacent to the sensor, the output from the sensor will not vary. This can prevent errors in measurement of the sensor caused by the application of force to other sensor adjacent to the sensor. This can suppress significant reduction of the accuracy of measurement of distribution of force. This means that even when the plurality of sensors are arranged to be adjacent to each other, only the sensor to which a force of not less than a predetermined magnitude (sufficient to bring the second and third electrodes into contact with each other) is applied serves as a force sensor.

In the sensor sheet of the present invention, the sensor may further comprise a core member formed of rigid material to cause the second electrodes to be displaced by the force applied to the sensor from outside. According to this construction, the force applied to the sensor from outside can be transmitted to the second electrode efficiently. This can provide the result that particularly when a force is detected by using an inclination of the second electrode to which the force is applied from outside (difference between displacement of one end of the second electrode and displacement of other end of the same), the inclination of the second electrode can easily be detected to produce improved accuracy of detection of the sensor.

In the sensor sheet of the present invention, the sensors may be arranged in matrix. According to this construction, since the sensors are arranged uniformly over the entire area of the sensor sheet, the distribution of force applied from outside to the sensor sheet can be detected with high accuracy.

In the sensor sheet of the present invention, it is preferable that the plane to receive the force applied from outside is formed to have substantially no projections and depressions. According to this construction, since the plane to receive the force applied from outside is flat without any projections and depressions, the distribution of force can be measured under a usual condition, not under any specific condition for the measurement.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

In the following, certain preferred embodiments of the present invention are described with reference to the accompanying drawings.

Figure 1:
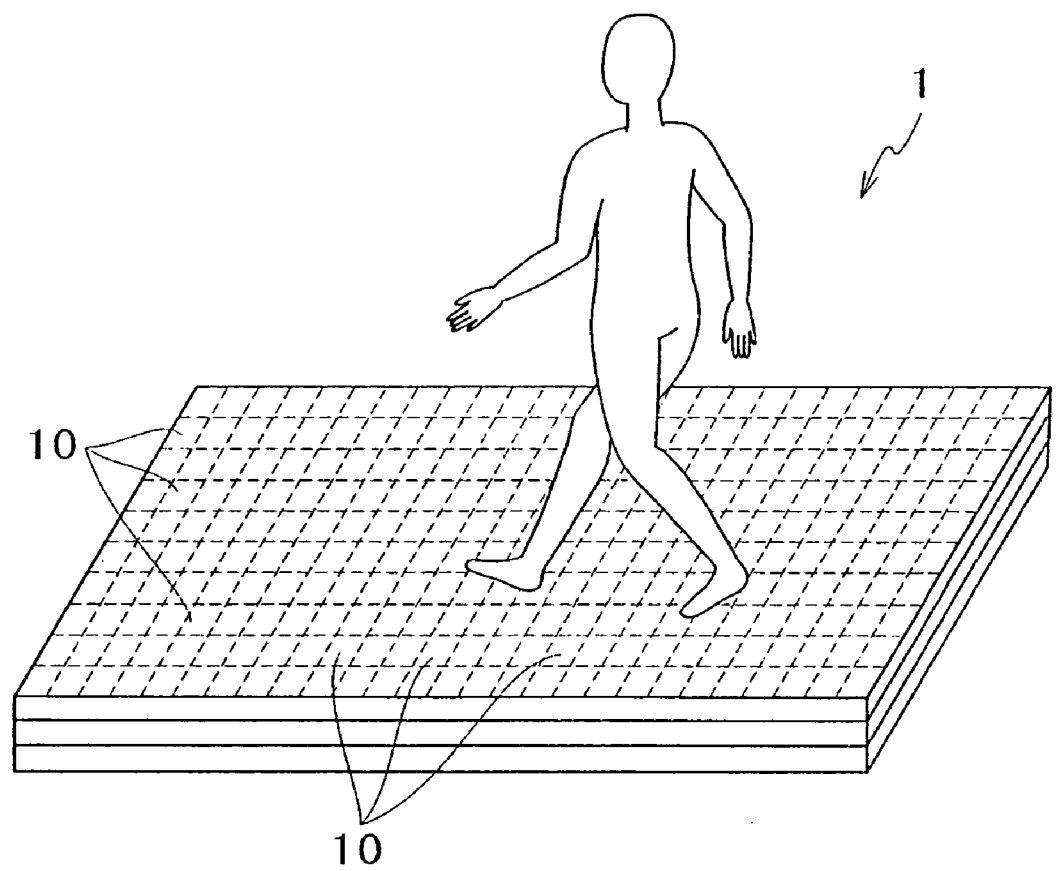
FIG. 1 is a perspective view of a sensor sheet according to an embodiment of the present invention.

First, reference is made of a construction of a sensor sheet 1 according to an embodiment of the present invention with reference to FIG. 1. FIG. 1 is a perspective view of the sensor sheet according to an embodiment of the present invention.

The sensor sheet 1 of FIG. 1 is used for measuring and analyzing a person's manner of walking, such as lifting one's foot from the ground and landing one's foot on the ground. The sensor sheet 1 of this embodiment is a sheet member having width and length enough for a person to walk thereon. The sensor sheet 1 has a number of sensor cells 10 arrayed in matrix. In the illustrated sensor sheet 1, a number of sensor cells 10 are arrayed at intervals of the order of 10 mm, though the interval between adjacent sensor cells 10 may be changed arbitrarily. Also, in the illustrated embodiment, each sensor cell 10 includes a capacitance type sensor, as will be mentioned later.

Figure 2:
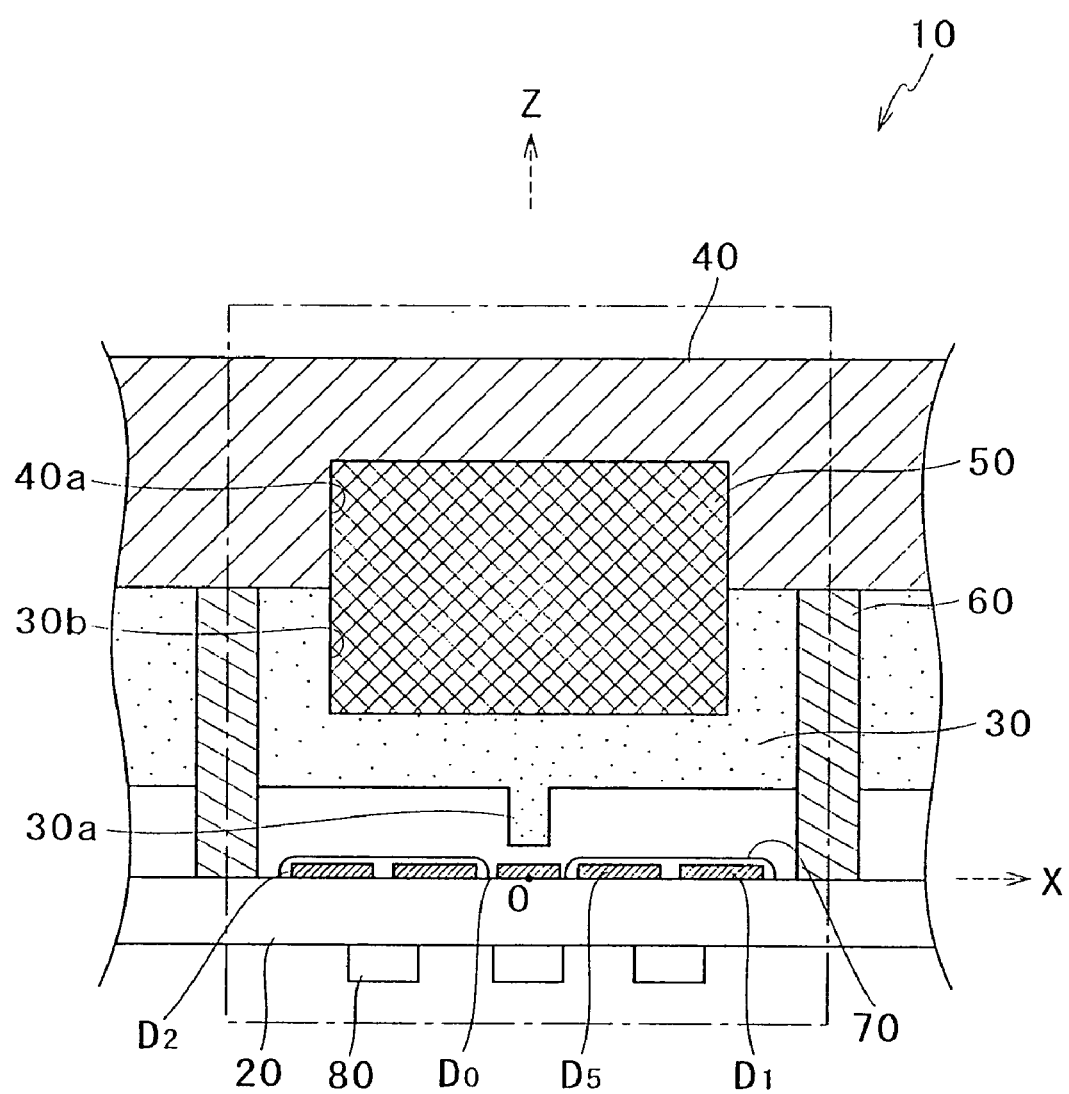
FIG. 2 is a schematic sectional view of a sensor cell included in the sensor sheet of FIG. 1.
Figure 3:
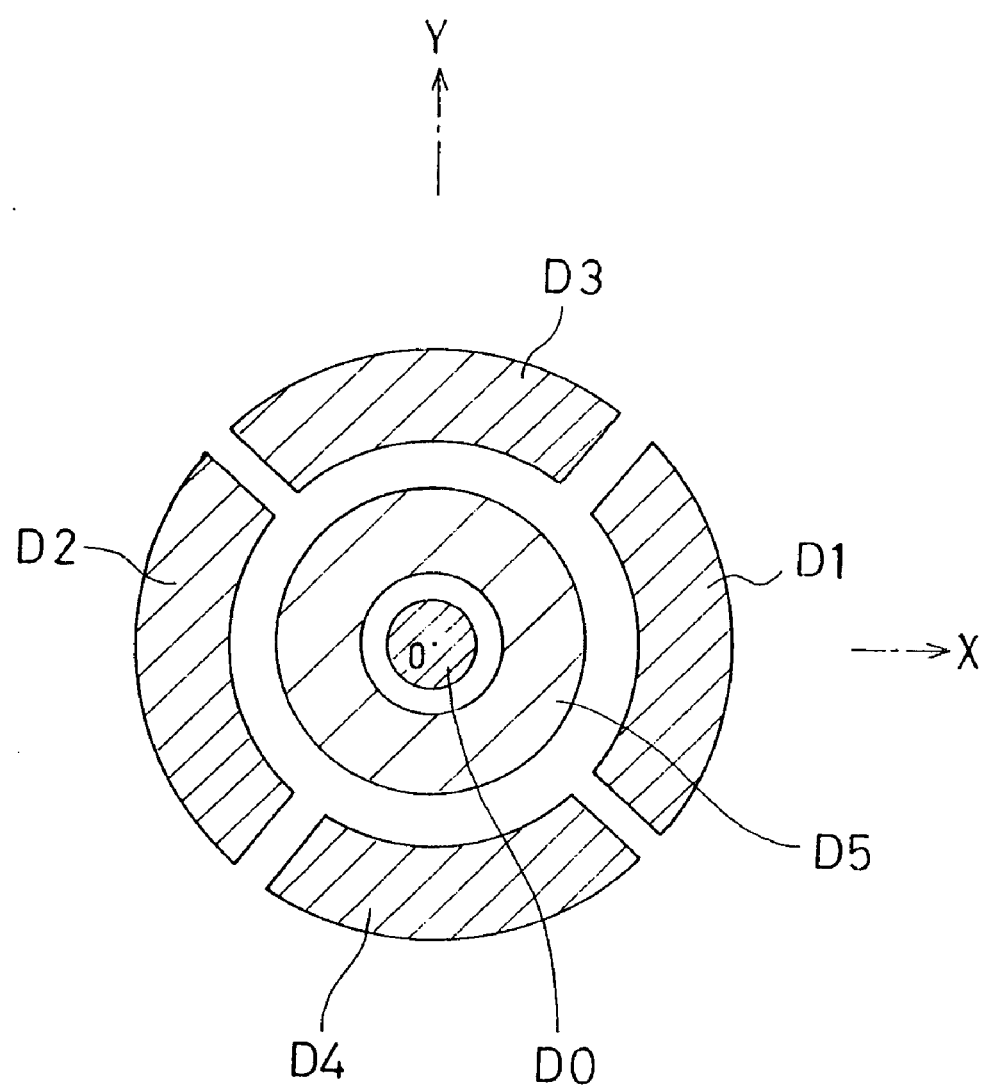
FIG. 3 is a view showing an arrangement of a plurality of electrodes formed on a substrate of the sensor cell of FIG. 2.

Now, reference is made herein to a construction of a single sensor cell 10, with reference to FIGS. 2 and 3. FIG. 2 is a schematic sectional view of the sensor cell included in the sensor sheet of FIG. 1. FIG. 3 is a view showing an arrangement of a plurality of electrodes formed on a substrate of the sensor cell of FIG. 2. The sensor cells 10 included in the sensor sheet 1 are all the same in construction.

The sensor cell 10 (an area enclosed by a dashed line in FIG. 2) has a substrate 20, capacitance element electrodes D1–D5 formed on the substrate 20 (only D1, D2, and D5 are shown in FIG. 2), a reference electrode (a common electrode) D0, a displacement electrode 30, a cover layer 40 on which a force applied from outside is exerted, a core 50 disposed between the cover layer 40 and the displacement electrode 30, a supporting member 60, an insulating film (a resist film) 70 laid over the substrate 20 to cover it, while closely contacting with capacitance element electrodes D1–D5, and sensor circuit components 80. In the illustrated embodiment, the substrate 20 and the cover layer 40 are common members for all sensor cells 10 included in the sensor sheet 1.

For convenience of explanation, a XYZ three-dimensional coordinate system is defined herein to explain a construction of a sensor cell 10, as illustrated. Referring to this coordinate system, the placement of components of the sensor cell 10 is described. Specifically, in FIG. 2, an origin O is defined at the center of the reference electrode D0 on the substrate 20, letting an X-axis be in a horizontally rightward direction, a Y-axis be in a depth direction orthogonal to the vertical direction, when viewed from the paper, and a Z-axis be in a vertically upward direction. A surface of the substrate 20 defines a plane XY, and the Z-axis passes center positions of the displacement electrode 30 and the core 50 with respect to a sensor cell 10.

The substrate 20 is a flexible printed circuit board (FPC) having flexibility. In the illustration, a film substrate formed of e.g. polyimide is used as the substrate 20. Alternatively, a printed circuit board used for a general electronic circuit, such as glass epoxy copper clad laminate, may be used as the substrate 20. The substrate 20 has, on its lower surface, sensor circuit components 80 including microcomputer and sensor circuit (electronic circuit).

A circular reference electrode D0 with center at the origin O, an annular capacitance element electrode D5 positioned outside of the reference electrode D0 and capacitance element electrodes D1–D4 of a general sector form positioned outside of the capacitance element electrode D5 are arranged on the substrate 20, as shown in FIG. 3. The capacitance element electrodes D1–D5 and the reference electrode D0 may be formed from copper foil, or printed on the substrate 20 in a screen printing using conductive ink using e.g. silver or carbon as raw material.

The capacitance element electrodes D1 and D2 are disposed to correspond to an X-axis positive direction and an X-axis negative direction, respectively, so that they are used to detect components of force applied form outside for the X-axis directions. The capacitance element electrodes D3 and D4 are disposed to correspond to a Y-axis positive direction and a Y-axis negative direction, respectively, so that they are used to detect components of force applied from outside for the Y-axis directions. The pair of capacitance element electrodes D1 and D2 are spaced apart in the X-axis direction and are disposed symmetrically with respect to the Y-axis. The pair of capacitance element electrodes D3 and D4 are spaced apart in the Y-axis direction and are disposed symmetrically with respect to the X-axis. Also, the capacitance element electrode D5 is disposed symmetrically with respect to the origin O and used to detect components of force applied from outside for the Z-axis directions.

The displacement electrode 30 is formed of material having conductivity and elasticity such as silicon rubber and is disposed over the substrate 20 in such a manner as to be opposite to the capacitance element electrodes D1–D5. The displacement electrode 30 is supported by a supporting member 60 in such a manner that a predetermined space is defined between the displacement electrode 30 and the substrate 20. Capacitance elements C1–C5 are formed between the displacement electrode 30 and the capacitance element electrodes D1–D5, as mentioned later. It should be noted that when a force is applied to the cover layer 40 from outside, the space between the displacement electrode 30 and the capacitance element electrodes D1–D5 is narrowed, while on the other hand, when the applied force is released therefrom, the narrowed space is returned to its original state. Accordingly, the capacitance elements C1–C5 are all considered as variable capacitance elements, as mentioned later.

The insulating film 70 comprising e.g. resist ink is laid over the substrate 20 to cover it, while closely contacting with capacitance element electrodes D1–D5. This insulating film 70 serves to prevent the displacement electrode 30 from being direct contacted with the capacitance element electrodes D1–D5 when the displacement electrode 30 happens to be displaced in a direction of its moving close to the capacitance element electrodes D1–D5, thus protecting the sensor circuit against operation mistake or accidental operation. Since the reference electrode D0 on the substrate 20 is exposed without being covered with the insulating film 70, the surface of the reference electrode D0 should preferably be plated, for example, by solder plating, gold plating, or silver plating, for prevention of oxidization of the electrodes.

The displacement electrode 30 has, on its lower surface (surface opposite to the substrate 20) at a central position thereof, a column-shaped protrusion 30a having a diameter substantially equal to or slightly smaller than that of the reference electrode D0. It should be noted that when no force is applied to the cover layer 40 from outside, a front end of the protrusion 30a is not in contact with the reference electrode D0 on the substrate 20 but is spaced apart therefrom. In other words, the protrusion 30a of the displacement electrode 30 has a height smaller than an interval of the space defined between the displacement electrode 30 and the substrate 20.

The displacement electrode 30 has a circular recess 30b formed in a center of an upper surface thereof (surface not opposite to the substrate 20). The circular recess 30b has an outer diameter slightly smaller than a diameter of a circle formed by connecting outer circular arcs of the capacitance element electrodes D1–D4. Also, the recess 30b has a depth nearly equal to one half of thickness of the core 50.

The displacement electrode 30 may be formed, for example, of other conductive rubber than silicon rubber, conductive thermoplastic resin (e.g. PPT, elastomer), conductive plastic, and metal.

The supporting member 60 is configured so that a large number of sensor cells 10 included in the sensor sheet 1 can be partitioned each other. It serves to support each of the displacement electrodes 30 of each of the sensor cell 10 to the substrate 20. The supporting member 60 is formed of material having elasticity such as silicon rubber.

The core 50 is a column-shaped metal member to efficiently transmit the force applied to the cover layer 40 from outside to the displacement electrode 30. The core 50 has a diameter substantially equal to that of the recess 30b formed in the displacement electrode 30 (substantially the same circular cross section) and also has a thickness substantially twice as thick as a depth of the recess 30b. When the core 50 is inserted in the recess 30b of the displacement electrode 30, nearly one half of the core 50 on an upper end side thereof protrudes from an upper surface of the displacement electrode 30.

The core 50 need not necessarily be a column-shaped metal member. The core 50 may be formed from any other material than metal, such as resin, as long as the material is more rigid than the materials from which the displacement electrode 30 and the cover layer 40 are formed. It may also be formed in any other form than the column-shape, such as a quadratic prism.

The cover layer 40 is a film member to directly receive the force applied from outside, which is laid over the displacement electrode 30 and the core 50 to cover them. The cover layer 40 is formed from silicon rubber having elasticity. The cover layer 40 has a recess 40a formed in a lower surface thereof. The recess 40a has a diameter substantially equal to that of the core 50 and a depth nearly one half of thickness of the core 50. The cover layer 40 covers the displacement electrode 30 and the core 50, while closely contacting with almost all areas of upper surfaces of the same. Also, the cover layer 40 has an upper surface (exposed surface) flattened not to have any projections and depressions. The cover layer 40 may be formed from other rubber than silicon rubber or material having elasticity such as synthetic resin like vinyl chloride resin.

In this embodiment, since the displacement electrode 30 and the cover layer 40 are both formed of silicon runner having elasticity (flexibility), they can provide the result of cushioning the shock of the force applied to the sensor cell 10 (the cover layer 40) to protect the sensor cell 10 against the shock and thus provide improved durability. Further, they can provide additional results of dust-proof and water-proof. When the core 50 is displaced, the displacement electrode 30 and the cover layer 40 can be elastically deformed in accordance with such deformation.

The cover layer 40 and the displacement electrode 30 need not necessarily be connected at a nearly center position of the core 50 with respect to a thickness direction of the core 50, but may be connected at a position where they do not contact with the core 50. For example, only the displacement electrode 30 may be arranged to surround the core 50, without using the cover layer 40. Alternatively, the cover layer 40 may be arranged over the displacement electrode 30 to surround the core 50.

Figure 4:
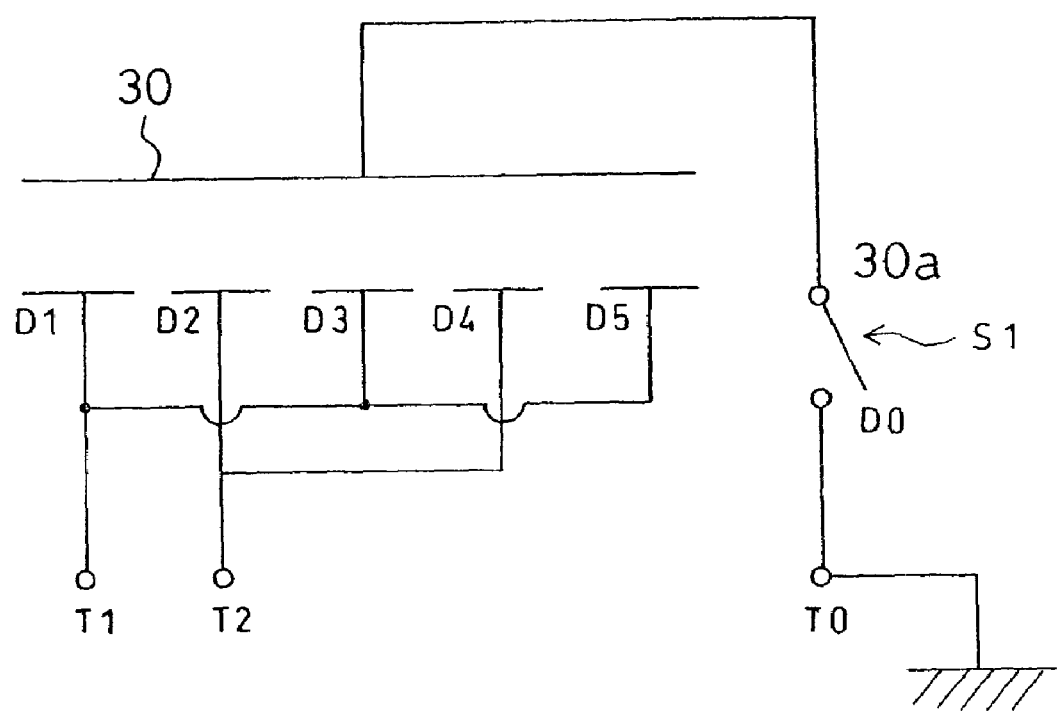
FIG. 4 is a view showing an equivalent circuit diagram for the construction of the sensor cell shown in FIG. 2.

Reference is now made to the circuitry of the sensor cell 10 with reference to FIG. 4. FIG. 4 is an equivalent circuit diagram for the construction of the sensor cell shown in FIG. 2.

In the sensor cell 10, the capacitance element electrodes D1–D5 arranged on the substrate 20 and the displacement electrode 30 are opposite to each other. The capacitance elements C1–C5 are formed between the displaceable displacement electrode 30 that is a common electrode and the individual fixed capacitance element electrodes D1–D5. It is to be noted here that the capacitance elements C1–C5 are variable capacitance elements that are each constructed to vary in capacitance value caused by displacement of the displacement electrode 30.

The capacitance element electrodes D1–D5 and the reference electrode D0 are connected to sensor circuits of sensor circuit components 80 provided on the lower surface of the substrate 20 through any of terminals T1, T2, and T0. In this embodiment, the reference electrode D0 is connected to ground through the terminal T0.

A switch S1 is formed between the displacement electrode 30 (or rather the protrusion 30a) and the reference electrode D0. In other words, the switch S1 is constructed to select either the contact mode (ON-state) of the displacement electrode 30 with the reference electrode D0 or the non-contact mode (OFF-state) of the displacement electrode 30 with the reference electrode D0.

In the sensor cell 10 of this embodiment, when no force is applied to the cover layer 40 from outside, the displacement electrode 30 and the reference electrode D0 are spaced apart from each other (OFF-state of the switch S1), so that the displacement electrode 30 is in an insulated state (a strayed state) without being kept at a specified voltage. In this state, no voltage is applied between the displacement electrode 30 and the capacitance element electrodes D1–D5, so that a quantity of electric charge stored in the capacitance elements C1–C5 is so small that it may be ignored. Although some stray capacitance may exist around the capacitance element electrodes D1–D5, since it is substantially negligible, as compared with a quantity of electric charge stored in the capacitance elements C1–C5, the stray capacitance is ignored herein.

On the other hand, when a force larger than a predetermined force is applied to the cover layer 40 from outside, the displacement electrode 30 and the reference electrode D0 are put into contact with each other (the switch S1 is put in the ON-state), so that the displacement electrode 30 is connected to ground through the reference electrode D0. When voltage is applied to the capacitance element electrodes D1–D5 in this state, the electric charge comes to be stored in the capacitance elements C1–C5 and the quantity of electric charge stored in the capacitance elements C1–C5 increases sharply, as compared with when the switch S1 is in the OFF-state. It is to be noted that when the displacement electrode 30 is in the contacted state with the reference electrode D0, the force applied from outside can be detected by using cyclic signals which are input from the terminal T1 or T2 connected to the capacitance element electrode D1–D5 and pass through a delay circuit including the capacitance elements C1–C5.

As mentioned above, when the switch S1 is in the OFF-state, the quantity of electric charge stored in the capacitance elements C1–C5 is so small that it may be ignored, so that output signals corresponding to the capacitance elements C1–C5 of the sensor cell 10 are kept stable at a certain level. On the other hand, when the switch S1 is in the ON-state, the quantity of electric charge stored in the capacitance elements C1–C5 increases sharply, so that the output signals corresponding to the capacitance elements C1–C5 of the sensor cell 10 vary significantly in accordance with the variation of the capacitance values of the capacitance elements C1–C5.

Therefore, the quantity of electric charges stored in the capacitance elements C1–C5 before the force is applied to the cover layer 40 from outside and the quantity of electric charges stored in the capacitance elements C1–C5 after the application of the force are both so small that they may be ignored, as compared with while the force is being applied to the cover layer 40 from outside. Therefore, even when the cover layer 40 is out of position from its initial position to cause the displacement electrode 30 to be poorly returned to its initial position, the output signals corresponding to the capacitance elements C1–C5 of the sensor cell 10 before the force is applied from outside are substantially the same as those after the application of the force and thus are returned to the original values with high reproducibility. Therefore, in the sensor cell 10, the output signals corresponding to the capacitance elements C1–C5 can be reduced in hysteresis.

Figure 5:
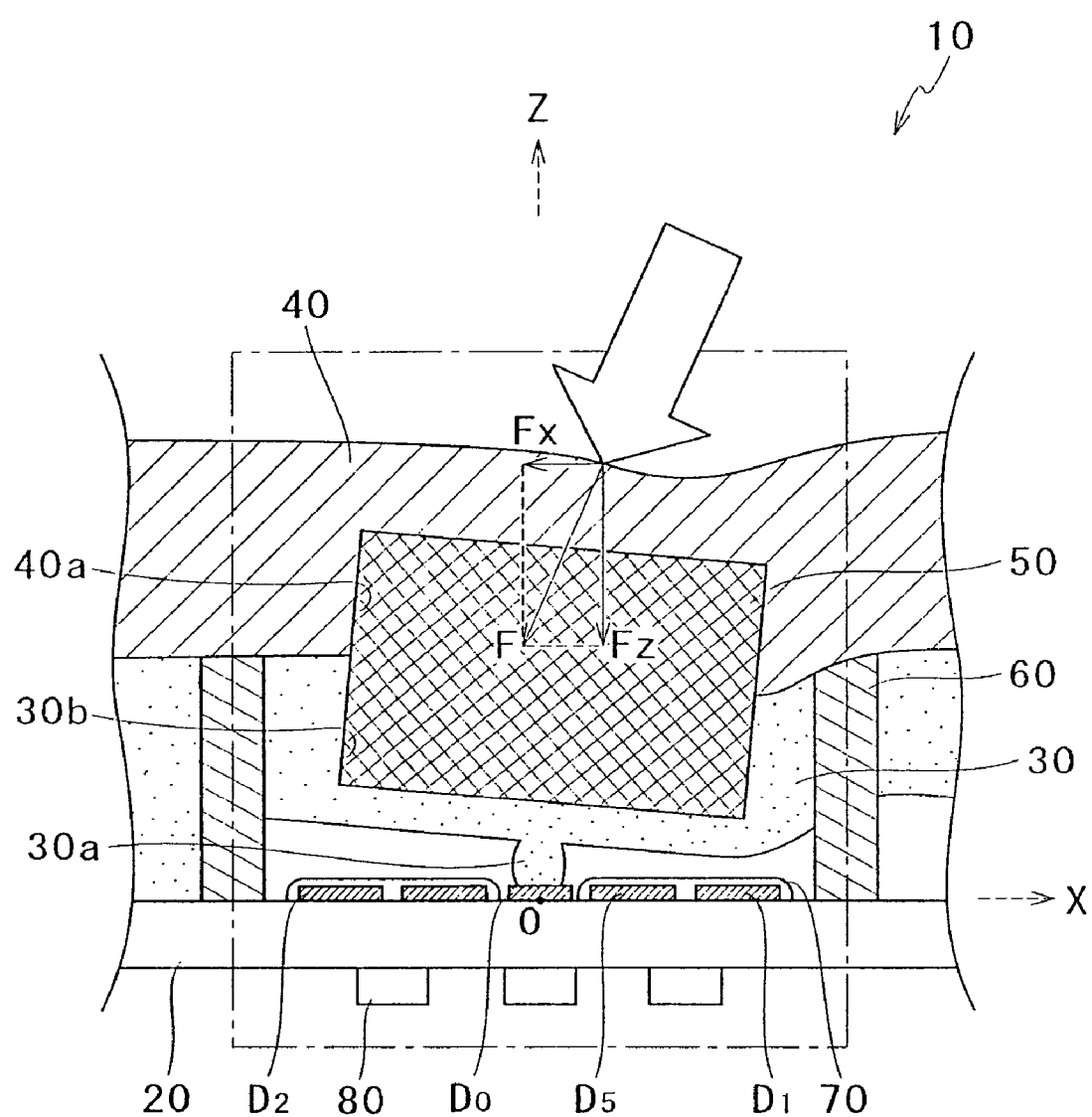
FIG. 5 is a schematic cross-sectional side view of the sensor cell shown in FIG. 2 when a force is applied to the sensor cell from outside.

Next, operation of the thus constructed sensor cell 10 will be described with reference to FIG. 5. FIG. 5 is a schematic cross-sectional side view of the sensor cell shown in FIG. 2 when the force is applied to the sensor cell from outside. FIG. 5 illustrates that a force F comprising a component of force Fx of the X-axis direction and a component of force Fz of the Z-axis direction is applied to the sensor cell 10.

When the force F is applied to the cover layer 40 from outside, the cover layer 40 is elastically deformed and displaced downwardly at a force F applied portion thereof. At this time, the core 50 and the displacement electrode 30 are displaced downwardly at portions thereof near the force-applied portion of the cover layer 40. When a central portion of the displacement electrode 30 is pressed down to a predetermined level, the protrusion 30a of the displacement electrode 30 is brought into contact with the reference electrode D0. As a result, the switch S1 is switched from the ON-state to the OFF-state.

Then, when the force-applied portion of the cover layer 40 is pressed down further, the cover layer 40, the displacement electrode 30 and the supporting member 60 are elastically deformed, while the switch S1 is kept in the ON-state. Then, the portion of the displacement electrode 30 corresponding to the force F, in other words, the portion of the displacement electrode 30 of the X-axis positive direction as viewed in FIG. 5 is displaced downward further. The displacement electrode 30 is constructed so that its X-axis positive direction portion and its X-axis negative direction portion can be displaced in a direction vertically opposite to each other, with the protrusion 30a as a fulcrum. Accordingly, when the X-axis positive direction portion of the displacement electrode 30 is displaced downward, the X-axis negative direction portion of the displacement electrode 30 is displaced upward, with the protrusion 30a as the fulcrum.

Also, a Y-axis positive direction portion of the displacement electrode 30 on the side of the X-axis positive direction is slightly displaced downward and the Y-axis positive direction portion of the displacement electrode 30 on the side of the X-axis negative direction is slightly displaced upward. Similarly, a Y-axis negative direction portion of the displacement electrode 30 on the side of the X-axis positive direction is slightly displaced downward and the Y-axis negative direction portion of the displacement electrode 30 on the side of the X-axis negative direction is slightly displaced upward. At that time, the protrusion 30a is pressed into a flattened state and elastically deformed, so that the displacement electrode 30 (the portion corresponding to the capacitance element electrode D5) is wholly displaced downward.

Accordingly, the interval between the displacement electrode 30 and the capacitance element electrode D1 is decreased, while on the other hand, the interval between the displacement electrode 30 and the capacitance element electrode D2 is increased. Also, the interval between the displacement electrode 30 and the capacitance element electrode D5 is decreased. At this time, the interval between the Y-axis positive direction portion of the displacement electrode 30 and the capacitance element electrode D3 and the interval between the Y-axis negative direction portion of the displacement electrode 30 and the capacitance element electrode D4 appear be unvaried on the average. In fact, the Y-axis positive direction portion and the Y-axis negative direction portion of the displacement electrode 30 on the side of the X-axis positive direction are slightly displaced downward and those portions of the displacement electrode 30 on the side of the X-axis negative direction is slightly displaced upward, as mentioned above, but it appears that the interval between the capacitance element electrodes D3, D4 is unvaried when taking the Y-axis positive direction portion and the Y-axis negative direction portion of the displacement electrode 30 as a whole.

As mentioned above, when the force F is applied to the cover layer 40 from outside, only the capacitance elements C1, C2 and C5 of the capacitance elements C1–C5 which varied in the interval between the displacement electrode 30 and the capacitance element electrodes D1–D5 vary in capacitance value. At this time, in a signal processing circuit for detecting the component of force of the X-axis direction, a cyclic signal A and a cyclic signal B input to the terminals T1 and T2 respectively are shifted in phase when passing through a delay circuit including the capacitance elements C1 and C2. An output signal Vx corresponding to the component Fx of the force F of the X-axis direction is derived by reading the phase shift or lag of those cyclic signals. Similarly, in a signal processing circuit for detecting the component of force of the Z-axis direction, the cyclic signal A input to the terminal T1 is shifted in phase when passing through a delay circuit including the capacitance element C5. An output signal Vz corresponding to the component Fz of the force F of the Z-axis direction is derived by reading the phase shift or lag of the cyclic signal (practically as well as the phase shift or lag of the cyclic signal B input to the terminal T2).

Figure 6:
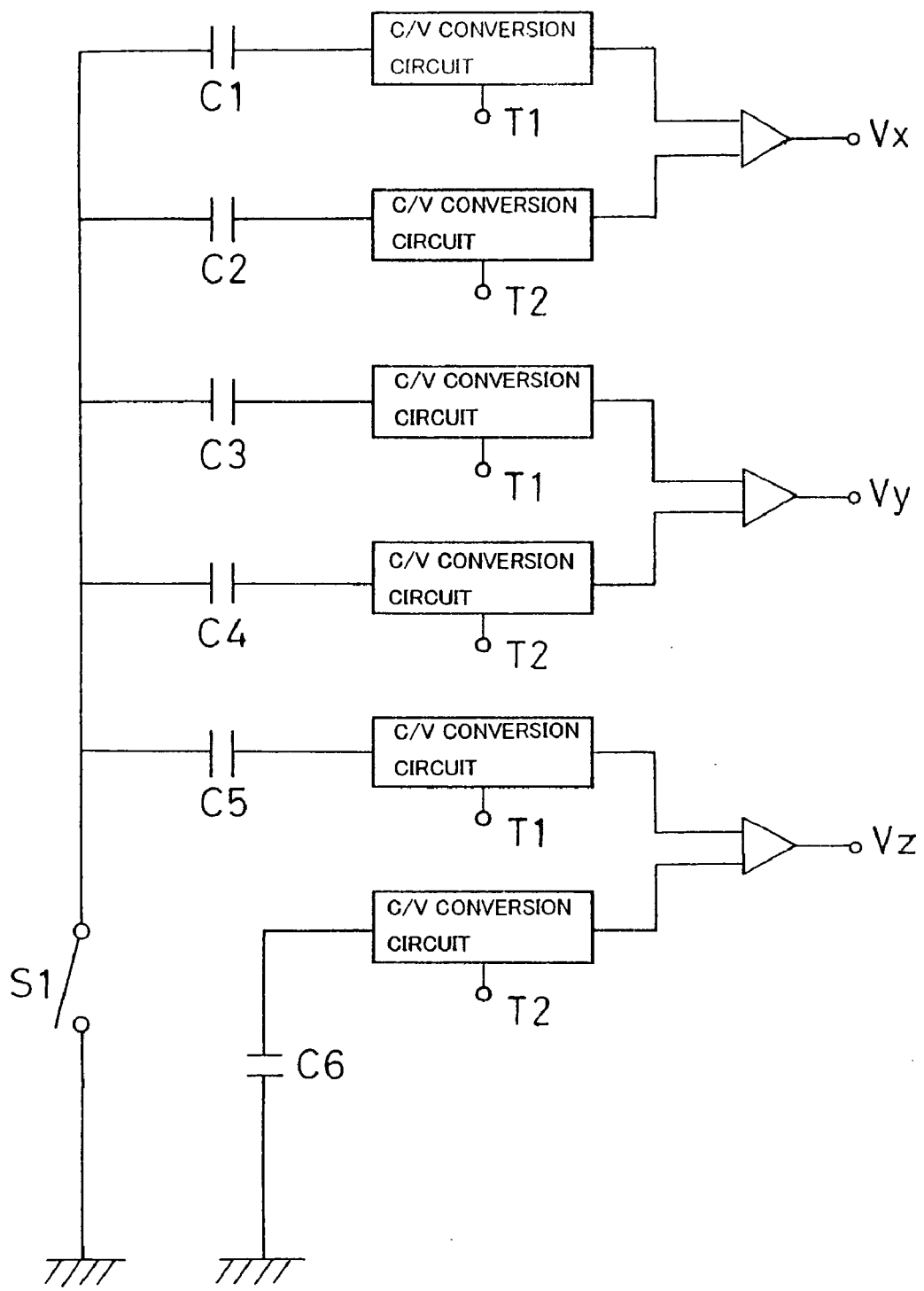
FIG. 6 is an illustration for explaining the way of deriving an output signal from a cyclic signal input to the sensor cell shown in FIG. 2.

Next, reference is made to the way of deriving an output signal showing magnitude and direction of a force applied from outside from variations of the capacitance values of the capacitance elements C1–C5, with reference to FIG. 6. FIG. 6 is an illustration for explaining the way of deriving an output signal from a cyclic signal input to the sensor cell shown in FIG. 2. It is to be noted that variations of the output signals Vx, Vy and Vz correspond to the component of the force applied from outside of the X-axis direction, that of the Y-axis direction and that of the Z-axis direction, respectively.

The capacitance element C6 shown in FIG. 6 is formed on the lower surface of the substrate 20 to always keep the capacitance value constant. One electrode forming the capacitance element C6 is connected to a C/V conversion circuit for deriving the output signal Vz and the other electrode is connected to ground. The capacitance element C6 and the capacitance element C5 are both used for deriving the output signal Vz of the component of force of the Z-axis direction.

In order to derive the output signals Vx, Vy and Vz, cyclic signals, such as clock signals, are input to the terminals T1, T2. When the cover layer 40 is pressed down by a force from outside having a larger magnitude than a predetermined magnitude in the state in which the cyclic signals are being input to the terminals T1, T2, the displacement electrode 30 is displaced at a center portion thereof in the Z-axis negative direction, so that the switch S1 between the protrusion 30a and the reference electrode D0 is switched to the ON-state with the displacement of the displacement electrode 30. Thereafter, the distance between the electrodes of each of the capacitance elements C1–C5 varies and thereby the capacitance value of each of the capacitance elements C1–C5 varies. Then, phase lags in the cyclic signals input to the terminals T1, T2 are produced. By using the phase lags produced in the cyclic signal, the displacement of the displacement electrode 30, i.e., the output signals Vx, Vy and Vz corresponding to the components of the force applied to the cover layer 40 from outside for the X-axis direction, the Y-axis direction, and the Z-axis direction respectively can be obtained.

In further detail, when the cyclic signal A is input to the terminal T1, the cyclic signal B of identical in periodicity with but different in phase from the cyclic signal A is input to the terminal T2. When the capacitance values of the capacitance elements C1–C5 are varied by a force applied to the cover layer 40 from outside at that time, at least either of the cyclic signal A input to the terminal T1 and the cyclic signal B input to the terminal T2 are shifted in phase. Specifically, in the signal processing circuit for detecting a component of force of each direction, when the capacitance values of the capacitance elements C1, C3 and C5 vary, the phase of the cyclic signal A input to the terminal T1 is shifted. On the other hand, when the capacitance values of the capacitance elements C2 and C4 vary, the phase of the cyclic signal B input to the terminal T2 is shifted.

In the signal processing circuit for detecting an X-axis direction component of force, when a force applied from outside includes an X-axis direction component, either the capacitance value of the capacitance element C1 varies to thereby produce the phase lag of the cyclic signal A input to the terminal T1 or the capacitance value of the capacitance element C2 varies to thereby produce the phase lag of the cyclic signal B input to the terminal T2, or both of them. The variations of the capacitance values of the capacitance elements C1, C2 correspond to the X-axis positive direction component of force from outside and the X-axis negative direction component of force from outside, respectively. The phase lag of the cyclic signal A input to the terminal T1 and the phase lag of the cyclic signal B input to the terminal T2 are read, for example, by an exclusive-OR gate or equivalent to derive the output signal Vx. A sign for variation of the output signal Vx indicates whether a component of force from outside is of an X-axis positive direction or an X-axis negative direction, and an absolute value of variation of the output signal Vx indicates a magnitude of the X-axis direction component of force. In this embodiment, the phase lag of the cyclic signal A input to the terminal T1 and the phase lag of the cyclic signal B input to the terminal T2 are often opposite in direction to each other.

In the signal processing circuit for detecting a Y-axis direction component of force, when a force applied from outside includes a Y-axis direction component, either the capacitance value of the capacitance element C3 varies to thereby produce the phase lag of the cyclic signal A input to the terminal T1 or the capacitance value of the capacitance element C4 varies to thereby produce the phase lag of the cyclic signal B input to the terminal T2, or both of them. The variations of the capacitance values of the capacitance elements C3, C4 correspond to the Y-axis positive direction component of force from outside and the Y-axis negative direction component of force from outside, respectively. The phase lag of the cyclic signal A input to the terminal T1 and the phase lag of the cyclic signal B input to the terminal T2 are read, for example, by the exclusive-OR gate or equivalent to derive the output signal Vy. A sign for variation of the output signal Vy indicates whether a component of force from outside is of a Y-axis positive direction or a Y-axis negative direction, and an absolute value of the output signal Vy indicates a magnitude of the Y-axis direction component of force. In this embodiment, the phase lag of the cyclic signal A input to the terminal T1 and the phase lag of the cyclic signal B input to the terminal T2 are often opposite in direction to each other.

Further, in the signal processing circuit for detecting a Z-axis direction component of force, when a force applied from outside includes a Z-axis direction component, the capacitance value of the capacitance element C5 varies to thereby produce the phase lag of the cyclic signal A input to the terminal T1. On the other hand, the capacitance value of the capacitance element C6 is kept constant, so that the phase of the cyclic signal B input to the terminal T2 is not shifted. Thus, only the phase of the cyclic signal A input to the terminal T1 is shifted. This phase lag of the cyclic signal A is read by the exclusive-OR gate to derive the output signal Vz. A sign for variation of the output signal Vz indicates whether a component of force from outside is of a Z-axis positive direction or a Z-axis negative direction, and an absolute value of the output signal Vz indicates a magnitude of the Z-axis direction component of force.

It should be noted that when a force applied from outside includes an X-axis direction component or a Y-axis direction component, the following phenomenon may develop, depending on the way of applying the force to the cover layer 40. Taking the X-axis direction for instance, there may be cases where a portion of the displacement electrode 30 corresponding to the X-axis positive direction and a portion of the displacement electrode 30 corresponding to the X-axis negative direction are both displaced downward, without being displaced in a direction vertically opposite to each other with its protrusion 30a as the fulcrum, and are different in distance of the downward displacement from each other. In this case, the phase of the cyclic signal A input to the terminal T1 and the phase of the cyclic signal B input to the terminal T2 are shifted in the same direction. By reading those phase lags by the exclusive-OR gate, the output signal Vx is derived in the same manner as in the case mentioned above. The same thing applies to the derivation of the output signal Vy for the Y-axis direction.

Figure 7:
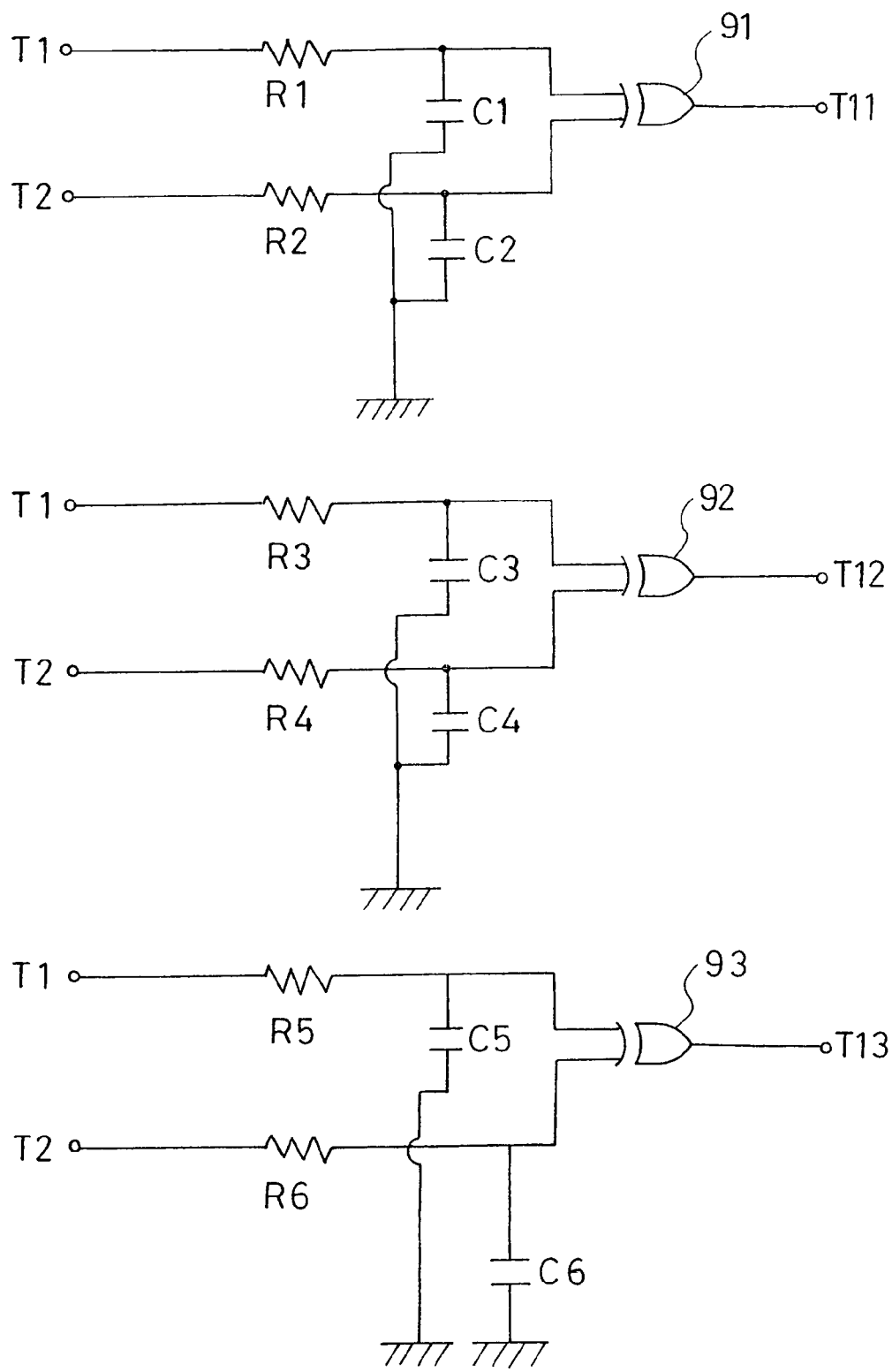
FIG. 7 is a circuit diagram showing a signal processing circuit of the sensor cell shown in FIG. 2.

Next, reference is made to the signal processing circuits for deriving the output signals Vx, Vy and Vz by using the cyclic signals A, B input to the terminals T1, T2, with reference to FIG. 7. FIG. 7 is a circuit diagram showing a signal processing circuit of the sensor cell shown in FIG. 2.

As shown in FIG. 7, cyclic signals of predetermined frequency are input to the terminals T1 and T2 from alternating current signal oscillator not shown. Also, resistance elements R1, R3 and R5 are connected to the terminal T1, and resistance elements R2, R4 and R6 are connected to the terminal T2. EX-OR elements 91–93 which are logic elements of the exclusive-OR gate are connected to output ends of the resistance elements R1 and R2, R3 and R4, and R5 and R6, respectively. The output ends are connected to their respective terminals T11–T13. The output ends of the resistance elements R1–R5 are connected to the capacitance element electrodes D1–D5 forming the capacitance elements C1–C5 with the displacement electrode 30, respectively. FIG. 7 illustrates the state in which the displacement electrode 30 is in contact with the reference electrode D0. The displacement electrode 30 that is one electrode to form the capacitance elements C1–C5 is connected to ground.

Figure 8:
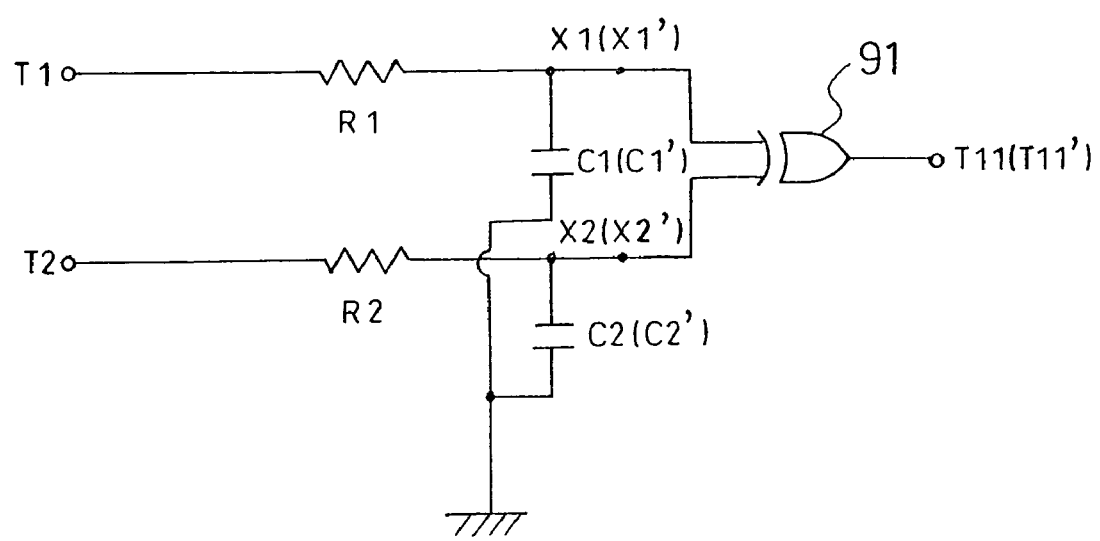
FIG. 8 is a circuit diagram showing a signal processing circuit for component for the X-axis direction of the sensor cell shown in FIG. 2.
Figure 9:
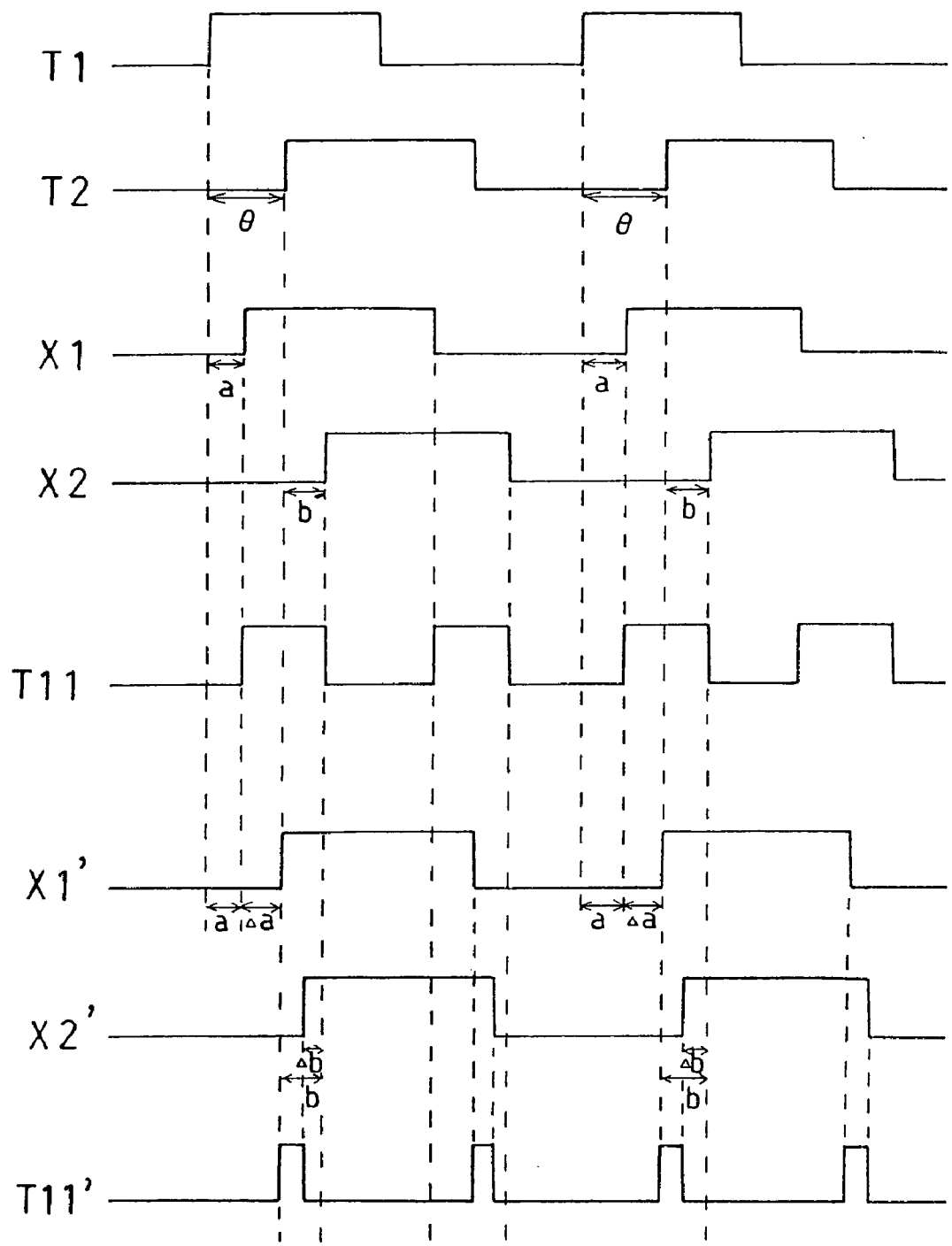
FIG. 9 is a view showing a waveform of a cyclic signal at each terminal and each node of the signal processing circuit shown in FIG. 8.

Reference is made herefrom to the way of deriving the output signal Vx of the X-axis direction component, with reference to FIGS. 8 and 9. FIG. 8 is a circuit diagram (a part of FIG. 7) showing a signal processing circuit for a component of force of the X-axis direction of the sensor cell shown in FIG. 2. FIG. 9 is a view showing a waveform of a cyclic signal at each terminal and each node of the signal processing circuit shown in FIG. 8.

In the signal processing circuit of FIG. 8, the capacitance element C1 and the resistance element R1, and the capacitance element C2 and the resistance element R2 form CR delay circuits, respectively. Accordingly, the cyclic signals (rectangular-wave signal) input to the terminals T1, T2, when passing through the CR delay circuits, are delayed to a specific extent by the respective CR delay circuits and then are input to an EX-OR element 91.

In more detail, a cyclic signal $f(\phi)$ (which corresponds to the cyclic signal A noted above) is input to the terminal T1, and a cyclic signal $f(\phi+\theta)$ (which corresponds to the cyclic signal B noted above) identical in periodicity with but different in phase from the cyclic signal $f(\phi)$ by $\theta$ only is input to the terminal T2. The cyclic signal $f(\phi)$ input to the terminal T1 passes through the CR delay circuit formed by the capacitance element C1 and the resistance element R1 and reaches the node X1. This introduces a delay of time a in the cyclic signal at the node X1, as shown in FIG. 9. Likewise, the cyclic signal $f(\phi+\theta)$ input to the terminal T2 passes through the CR delay circuit formed by the capacitance element C2 and the resistance element R2 and reaches the node X2. This introduces a delay of time b in the cyclic signal at the node X2.

The time a, b correspond to delay time in the CR delay circuit and are determined by their respective time constants of the CR delay circuit. Accordingly, if the resistance elements R1, R2 have the same resistance value, the time a, b will correspond to the capacitance values of the capacitance elements C1, C2. That is to say, with an increase in the capacitance values of the capacitance elements C1, C2, the values of the time a, b increase, and with a decrease in the capacitance values of the capacitance elements C1, C2, the values of the time a, b decrease.

Thus, the signals having the same waveform as the cyclic signals at the nodes X1, X2 are input to the EX-OR element 91, for an exclusive-OR logical operation between those signals and then the result is output to the terminal T11. It should be noted that the signal output to the terminal T11 is a rectangular-wave signal having a specified duty ratio (See FIG. 9).

Now, let us consider the waveform of the cyclic signals at the respective terminals and nodes appearing when a force is applied to the cover layer 40 from outside (See FIG. 5). The capacitance elements formed between the capacitance element electrodes D1, D2 and the displacement electrode 30 of the signal processing circuit are taken here as C1', C2'. Also, the nodes and the terminals corresponding in position to the nodes X1, X2 and the terminal T11 of the signal processing circuit when no force is applied to the cover layer 40 from outside are taken here as X1', X2', and T11', respectively (See FIG. 8).

At this time, in the signal processing circuit of FIG. 8, the cyclic signal f ($\phi$) is input to the terminal T1 and the cyclic signal f ($\phi+\theta$) of identical in periodicity with but different in phase from f ($\phi$) by $\theta$ is input to the terminal T2, as is the case with the above. The cyclic signal f ($\phi$) input to the terminal T1 passes through the CR delay circuit formed by the capacitance element C1' and the resistance element R1 and reaches the node X1'. This introduces a delay of time a+$\Delta$a in the cyclic signal at the node X1', as shown in FIG. 9. This is because the time constant of the CR delay circuit is increased with the capacitance value of the capacitance element C1' becoming larger than that of the capacitance element C1. On the other hand, the cyclic signal f ($\phi+\theta$) input to the terminal T2 passes through the CR delay circuit formed by the capacitance element C2' and the resistance element R2 and reaches the node X2'. This introduces a delay of time b−$\Delta$b in the cyclic signal at the node X2'. This is because the time constant of the CR delay circuit is decreased with the capacitance value of the capacitance element C2' becoming smaller than that of the capacitance element C2.

Thus, the signals having the same waveform as the cyclic signals at the nodes X1', X2' are input to the EX-OR element 91, for an exclusive-OR logical operation between those signals and then the result is output to the terminal T11'. It should be noted that the signal output to the terminal T11' is a rectangular-wave signal having a specified duty ratio and when no force is applied to the cover layer 40 from outside, as shown in FIG. 9, it is a rectangular-wave signal having a smaller duty ratio than the rectangular-wave signal output to the terminal T11.

In the sensor cell 10, since the displacement electrode 30 has the protrusion 30a serving as the fulcrum of the displacement of the displacement electrode 30, the capacitance value of the capacitance element C1' and that of the capacitance element C2' are often varied inversely. For example, with an increase of the capacitance value of one of the capacitance elements, the capacitance value of the other capacitance element decrease. As a result, the time constants of the CR delay circuits formed by the respective capacitance elements C1' and C2' are also varied in likewise manner, so that variation of the duty ratio of the rectangular waveform signal is varied significantly. Therefore, the force applied to the cover layer 40 can be easily detected. When the force is applied to the entire sensor cell 10, both of the capacitance values of the capacitance elements C1' and C2' are increased, but since the capacitance values of the capacitance elements C1' and C2' vary differently in accordance with a balance of force applied, the force applied to the cover layer 40 can also be detected.

In the signal processing circuit for deriving the output signal Vz of the Z-axis direction component (See FIG. 7), a certain delay is caused in only the signal input to the terminal T5 passing through the CR delay circuit, but the delay is not caused in the signal input to the terminal T6, because the signal input to the terminal T6 does not pass through the CR delay circuit. Thus, even in the circuit where a certain delay is caused in only the signal input to one of the terminals, the force applied to the cover layer 40 can be detected in the same manner as in the above.

The variation of the capacitance values of the capacitance elements C1, C2 is detected as variation of the duty ratio of the waveform in the terminal T1. Then, those output signals having such waveform are smoothed by passing them through a smoothening circuit and then the duty ratio is converted to an analog voltage, for use of the detection of force. A value of the analog voltage varies in proportion to the duty ratio of the output signal. Therefore, with an increase in the duty ratio of the output signal, the value of the analog voltage increases. On the other hand, with a decrease in the duty ratio of the output signal, the value of the analog voltage decreases. When the duty ratio of the output signal does not vary virtually, the value of the analog voltage does not vary virtually, either. By counting the time for the signal at a high level (Hi) or a low level (Lo) in the terminal T11 by using the clock signals of higher frequency, the duty ratio of the output signal can also be converted to the digitally counted value, for use of the detection of force.

The cyclic signal f ($\phi$) and the cyclic signal f ($\phi+\theta$) of different in phase from each other which are input to the terminals T1 and T2 respectively are generated by dividing the cyclic signals output from a single cyclic signal oscillator two routes and introducing the phase lag in the cyclic signal passing through the CR delay circuit (not shown) arranged in one of the two routes. The way of introducing the phase lag in the cyclic signal is not limited to the way using the CR delay circuit. Any other adequate ways may be used. The cyclic signals f ($\phi$) and f ($\phi+\theta$) of different in phase from each other may be generated by using two alternating current signal oscillators and then input to the terminals T1 and T2, respectively.

As described above, each of the sensor cells 10 included in the sensor sheet 1 can detect a X-axis direction component, a Y-axis direction component and a Z-axis direction component of a force applied from outside to the cover layer 40 corresponding to each of the sensor cells 10. Thus, distribution of the force applied to a surface of the entire sensor sheet 1 from the outside can be detected on the basis of the respective direction components of the force detected in each of the sensor cells 10.

Take an analysis of a person's walking pattern for instance, a characteristic walking pattern of the person being tested can be measured by measuring a relation between passage of time when the person being tested walks on the sensor sheet 1 and the output from the respective sensor cells 10. Also, a shearing force parallel to the sensor sheet 1 can also be measured and analyzed in a three-dimensional manner at that time. Hence, the sensor sheet of this embodiment can contribute to the study of a human engineering field. Also, since the sensor sheet 1 has a flat surface, the person being tested can walk on the sensor sheet without discouraging walking, so that the walking pattern of the person being tested can be measured under substantially the same condition as usual.

As described above, the sensor cells 10 can measure the force applied from outside only when the protrusion 30a of the displacement electrode 30 is in contact with the reference electrode D0. If only a force of parallel to the substrate 20 (the X-axis direction component of force and/or the Y-axis direction component of force) is applied to the cover layer 40, then the protrusion 30a of the displacement electrode 30 will never be brought into contact with the reference electrode D0 and accordingly the sensor cell 10 will not be able to measure the force. However, for example when a person walks on the sensor sheet 1, as mentioned above, it is impossible for the person to walk without applying the force of the Z-axis direction to the sensor sheet. In other words, the person cannot walk without applying the force of the Z-axis direction to the sensor sheet. Accordingly, this limit for the measurement will probably present no practical problem.

On the other hand, if only a force of parallel to the substrate 20 is applied to the cover layer 40, the force cannot be detected by the sensor cell. This can provide the following result. For example, in the analysis of a person's walking manner or pattern by using the sensor sheet having sensor cells 10 of a very small size (area), there may be cases where when a sole of foot of the person being tested is not in contact with a sensor cell 10, somewhat displacement of the displacement electrode 30 of the sensor cell 10 may be caused by a cover layer 40 of other sensor cell adjacent to the sensor cell 10 being displaced or deformed in the walking. According to the sensor sheet 1 of this embodiment, since the switch S1 is formed between the protrusion 30a of the displacement electrode 30 and the reference electrode D0, the sensor cell 10 does not serve as a force sensor until its displacement electrode 30 is connected to a ground potential by application of a component of force for the Z-axis direction of not less than a force sufficient to bring the protrusion 30a of the displacement electrode 30 and the reference electrode D0 into contact with each other. This can improve the accuracy of measurement of the distribution of force.

In the sensor cell whose displacement electrode is always kept at a ground potential, differently from the construction of the sensor cell 10 of this embodiment, the effect of the invention mentioned above can never be provided. In that sensor cell, the displacement electrode of the sensor cell with which a sole of foot of the person being tested is not in contact may also be displaced by a force applied to an adjacent sensor cell, to cause variation of the output of the sensor cell. As a result, a measurement error is caused and thereby the accuracy of measurement of the distribution of force is reduced.

The sensor sheet 1 of this embodiment is also useful, for example, for a three-dimensional dynamic analysis of a posture of a person seated in a car seat that is often caused to change by an inertia force depending on an operational status as a distribution of a person's body pressure applied to the car seat, as well as for the analysis of a person's walking manner or pattern as mentioned above. Additionally, the sensor sheet of this embodiment can also be used as other means such as measuring means for measuring the distribution of pressure when a shearing force is applied to the sensor sheet 1 in a direction parallel thereto. In this case also, the same effect can be provided.

A withstand load of the sensor sheet 1 may be adjusted in an appropriate manner, such as, for example, by changing a size of the sensor cell 10, or changing hardness and thickness of material of the displacement electrode 30 and cover layer 40.

As mentioned above, in the sensor sheet 1 according to this embodiment, each sensor cell 10 can detect the X-axis direction component, the Y-axis direction component, and the Z-axis direction component applied from outside. Thus, the entire sensor sheet 1 can measure a three-dimensional distribution of force applied from outside, including bidirectional components of force, i.e., a component of force vertical to the cover layer 40 and a component of force parallel thereto. This can allow a detailed analysis of the force applied to the sensor sheet 1.

Also, when no force is applied to the sensor cell 10 from outside, the displacement electrode 30 is put in an insulated state and no voltage is applied to the capacitance elements C1–C5 formed between the capacitance element electrodes D1–D5 and the displacement electrode 30. Due to this, a quantity of electric charges stored in the capacitance elements C1–C5 are so small that it may be ignored, so that the output signals from the sensor cell 10 are stably kept at a certain magnitude. On the other hand, when a force is applied to the sensor cell 10 from outside, the displacement electrode 30 is brought into contact with the reference electrode D0 connected to ground, so that voltage is applied to the capacitance elements C1–C5. Due to this, the quantity of electric charges stored in the capacitance elements C1–C5 increase sharply, so that the output signals from the sensor cell 10 vary significantly in accordance with the variation of the capacitance values of the capacitance elements C1–C5. Thus, the quantity of electric charges stored in the capacitance elements C1–C5 before the force is applied from outside and the quantity of electric charges stored in the capacitance elements C1–C5 after the application of the force are both so small that they may be ignored, as compared with while the force is being applied from outside. Therefore, even when the displacement electrode 30 is out of position from its initial position, the output signals corresponding to the capacitance elements C1–C5 of the sensor cell 10 (from the respective capacitance element electrodes D1–D5) before the force is applied from outside are substantially the same as those after the application of the force. Therefore, in the sensor cell 10, the output signals corresponding to the capacitance elements C1–C5 can be reduced in hysteresis.

Also, since the displacement electrode 30 and the reference electrode D0 serve as the switch S1 to take a contact position at which they are in contact with each other or a non-contact position, when the displacement electrode 30 of the sensor cell 10 to which no force is being applied from outside is displaced to an extent that will not bring the displacement electrode 30 of the sensor cell 10 and the reference electrode D0 into contact with each other by a force applied from outside to other sensor cell adjacent to the sensor cell 10, the output from the sensor cell 10 will not vary. This can prevent errors in measurement of the sensor cell 10 caused by the application of force to other sensor cell adjacent to the sensor cell 10 to which the force is applied. This can suppress significant reduction of the accuracy of measurement of distribution of force.

Also, since the metal core 50 is arranged between the cover layer 40 and the displacement electrode 30, the force applied from outside can be transmitted to the displacement electrode 30 efficiently. This can provide the result that particularly when a force is detected by using an inclination of the displacement electrode 30 to which the force is applied from outside, in other words, when an X-axis direction component of the force is detected on the basis of displacement of the portions of the displacement electrode 30 corresponding to the X-axis positive direction and the X-axis negative direction by using difference in amount of variation of capacitance values of the capacitance elements C1, C2 and when a Y-axis direction component of the force is detected on the basis of the displacement of the portions of the displacement electrode 30 corresponding to the Y-axis positive direction and the Y-axis negative direction by using difference in amount of variation of capacitance values of the capacitance elements C3, C4, the inclination of the displacement electrode 30 can easily be detected to thereby produce improved accuracy of detection of the sensor cell 10.

Also, since the sensor sheet 1 has a large number of sensor cells 10 which are arranged in matrix and arranged uniformly over the entire area of the sensor sheet 1, the distribution of force applied from outside to the sensor sheet 1 can be detected with high accuracy.

In addition, since the cover layer 40 which receives the force applied from outside has the surface flattened not to have any projections and depressions, the distribution of force can be measured under a usual condition, not under any specific condition for the measurement.

Figure 10:
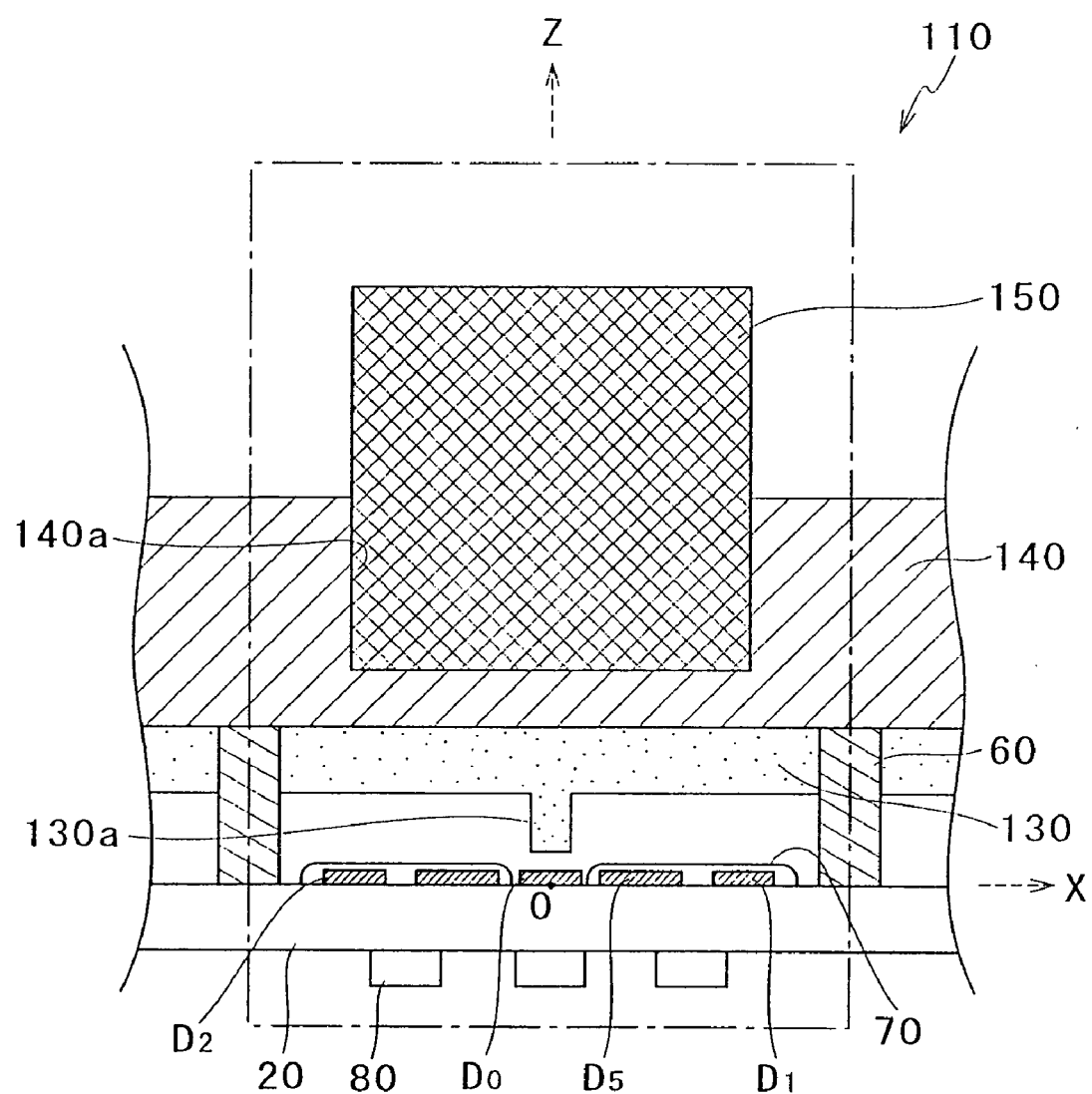
FIG. 10 is a schematic sectional view of a sensor cell included in a sensor sheet of a first variant of the embodiment of the present invention.

Next, a first variant of the embodiment of the present invention will be described with reference to FIG. 10. FIG. 10 is a schematic sectional view of a sensor cell included in a sensor sheet of the first variant of the embodiment of the present invention.

A sensor cell 110 included in a sensor sheet according to this variant significantly differs in construction from the sensor cell 10 of FIG. 2 in that in the sensor cell 10, the core 50 is arranged between the cover layer 40 and the displacement electrode 30, whereas in the sensor cell 110, a core 150 protrudes from a surface of a cover layer 140. Like numerals are given to like parts of the remaining constructions and the detailed description thereon is omitted.

In the sensor cell 110, a displacement electrode 130 is arranged to be opposite to the capacitance electrode elements D1–D5 and the reference electrode D0 arranged on the substrate 20 and has, on its lower surface, a protrusion 130a. The protrusion 130a has a flat upper surface. Also, a cover layer 140 is laid over an upper surface of the displacement electrode 130 to cover the displacement element 130. The cover layer 140 has a recess 140a formed therein and having a depth nearly equal to one half of height of the core 150. When the core 150 is inserted in the recess 140a of the cover layer 140, an upper half portion of the core 150 protrudes from the surface of the cover layer 140. The core 150 serves as a detecting portion to directly receive the force applied from outside. In this variant, the surface of the sensor sheet is not flat.

The circuitry of the sensor cell 110 and operation thereof are the same as those of the first embodiment.

As seen from the above, in the sensor sheet of this variant, each sensor cell 110 can detect the X-axis direction component, the Y-axis direction component and the Z-axis direction component of the force applied from outside, as is the case with the first embodiment. Accordingly, the sensor sheet of this variant can provide the same effects as those of the first embodiment. In addition, since the core 150 protrudes from the cover layer 140, even when only the force of parallel with the substrate 20 (the X-axis direction component of force and/or the Y-axis direction component of force) is applied to the core 150, the core 150 can allow the protrusion 130a of the displacement electrode 130 and the reference electrode D0 to contact with each other, for measurement of the force.

Figure 11:
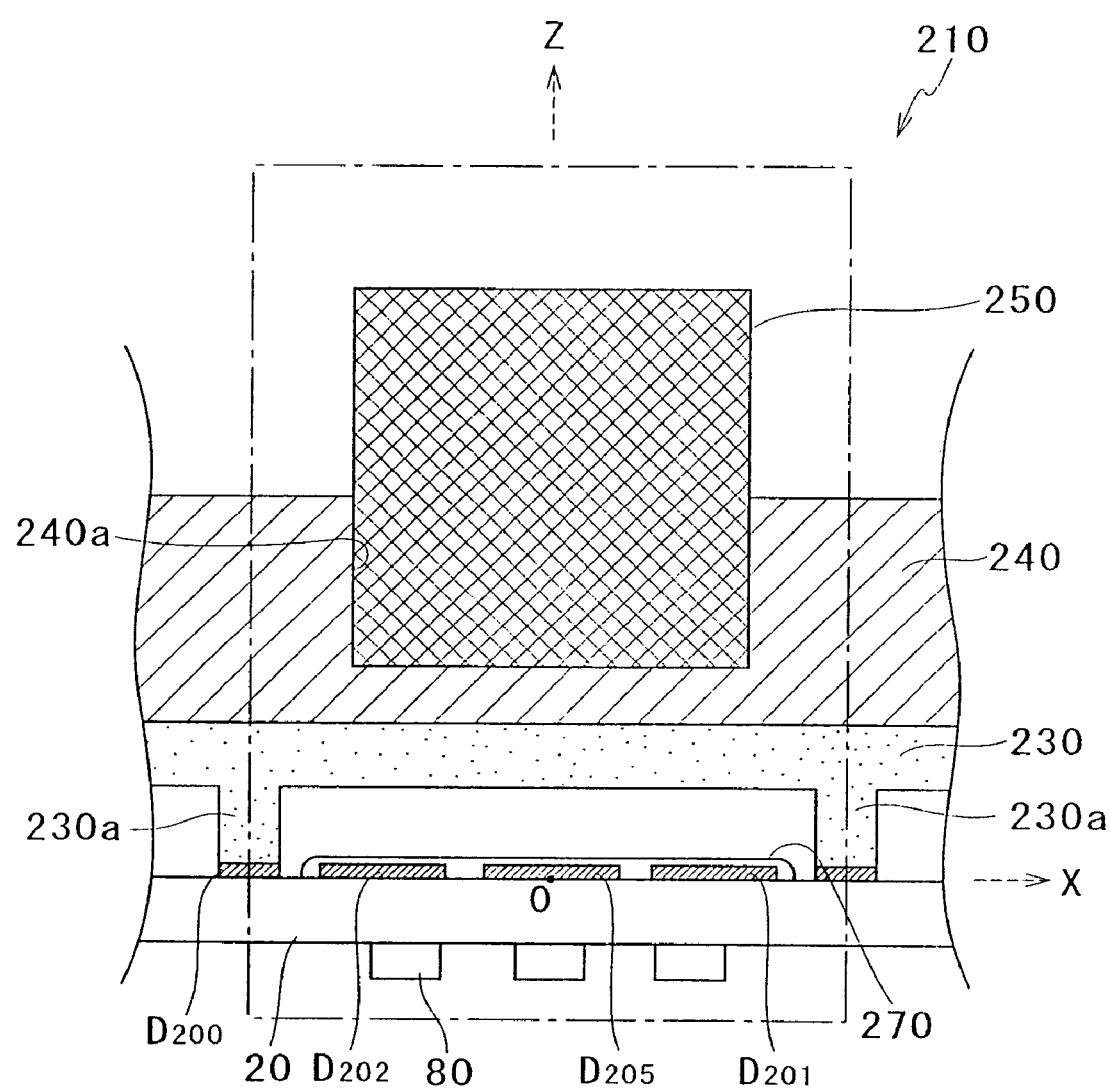
FIG. 11 is a schematic sectional view of a sensor cell included in a sensor sheet of a second variant of the embodiment of the present invention.
Figure 12:
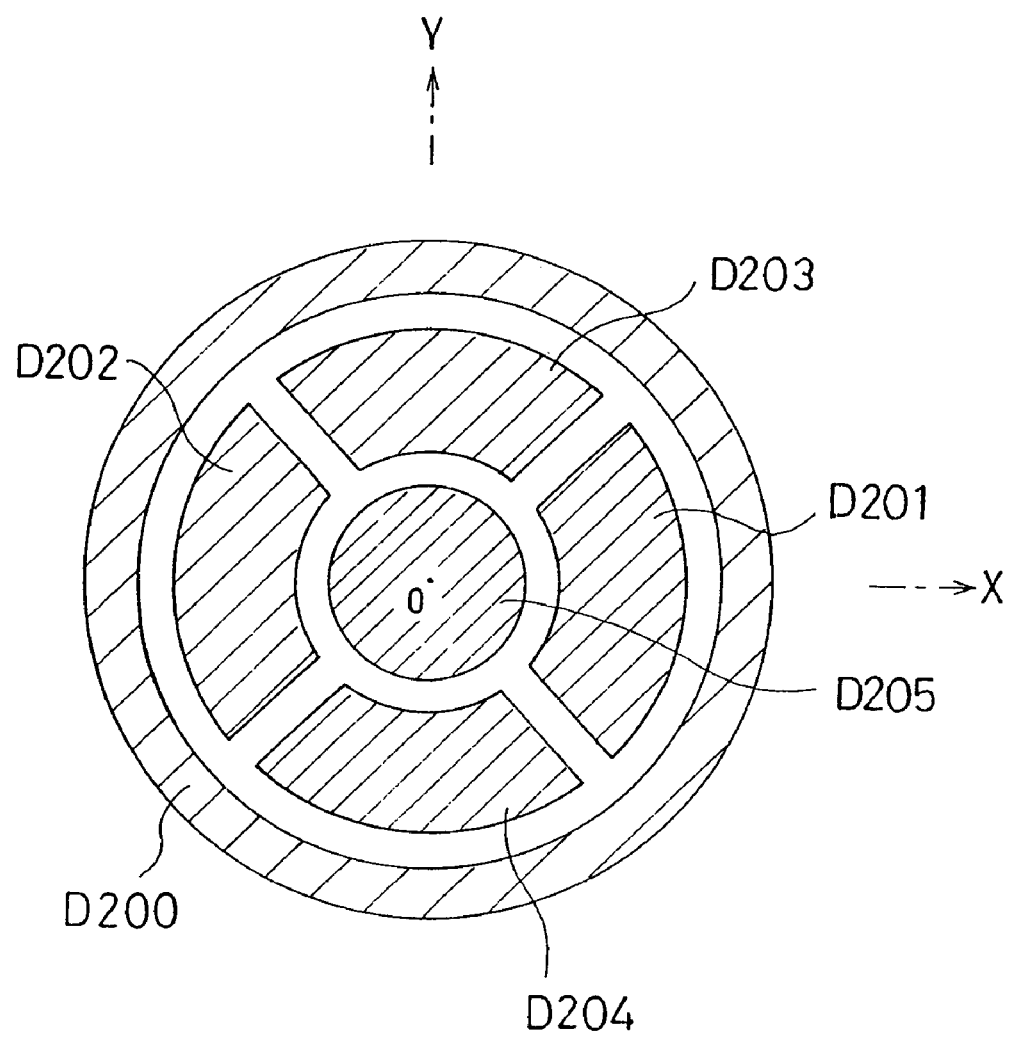
FIG. 12 is a view showing an arrangement of a plurality of electrodes formed on the substrate of the sensor cell of FIG. 11.

Next, a second variant of the embodiment of the present invention will be described with reference to FIG. 11. FIG. 11 is a schematic sectional view of a sensor cell included in a sensor sheet of the second variant of the embodiment of the present invention. FIG. 12 is a view showing an arrangement of a plurality of electrodes formed on the substrate of the sensor cell of FIG. 11.

A sensor cell 210 included in a sensor sheet according to this variant significantly differs in construction from the sensor cell 10 of FIG. 2 in that in the sensor cell 10, the core 50 is arranged between the cover layer 40 and the displacement electrode 30, so that when no force is applied from outside to the displacement electrode 30, the displacement electrode 30 is kept in its insulated state, whereas in the sensor cell 210, a core 250 protrudes from a surface of a cover layer 240 and the displacement electrode 230 is always connected to ground. Like numerals are given to like parts of the remaining constructions and the detailed description thereon is omitted.

In the sensor cell 210, a circular capacitance element electrode D205 with center at the origin O, capacitance element electrodes D201–D204 of a general sector form positioned outside of the capacitance element electrode D205 and an annular reference electrode D200 positioned outside of the capacitance element electrodes D201–D204 are arranged on the substrate 20, as shown in FIG. 12.

The displacement electrode 230 has, on its lower surface, a protrusion 230a having the same shape as that of the reference electrode D200. Also, the displacement electrode 230 is arranged so that a lower end of the protrusion 230a and the reference electrode D200 are in contact with each other and also is arranged to be opposite to the capacitance element electrodes D201–D205 arranged on the substrate 20. Thus, the displacement electrode 230 is connected to ground through the reference electrode D200, so that it is always kept at a ground potential. In this variant, the displacement electrode 230 is a common member for all sensor cells 210 included in the sensor sheet, as is the case with the substrate 20 and the cover layer 240.

Also, a cover layer 240 is laid over an upper surface of the displacement electrode 230 to cover the displacement element 230. The cover layer 240 has a recess 240a formed therein and having a depth nearly equal to one half of height of the core 250. When the core 250 is inserted in the recess 240a of the cover layer 240, an upper half portion of the core 250 protrudes from the surface of the cover layer 240. The core 250 serves as a detecting portion to directly receive the force applied from outside. In this variant, the surface of the sensor sheet is not flat.

The circuitry of the sensor cell 210 and operation thereof are the same as those of the first embodiment for the switch S1 to be always kept in the ON-state.

As seen from the above, in the sensor sheet of this variant, each sensor cell 210 can detect the X-axis direction component, the Y-axis direction component and the Z-axis direction component of the force applied from outside, as is the case with the first embodiment. Accordingly, the sensor sheet of this variant can provide the same effects as those of the first embodiment.

Figure 13:
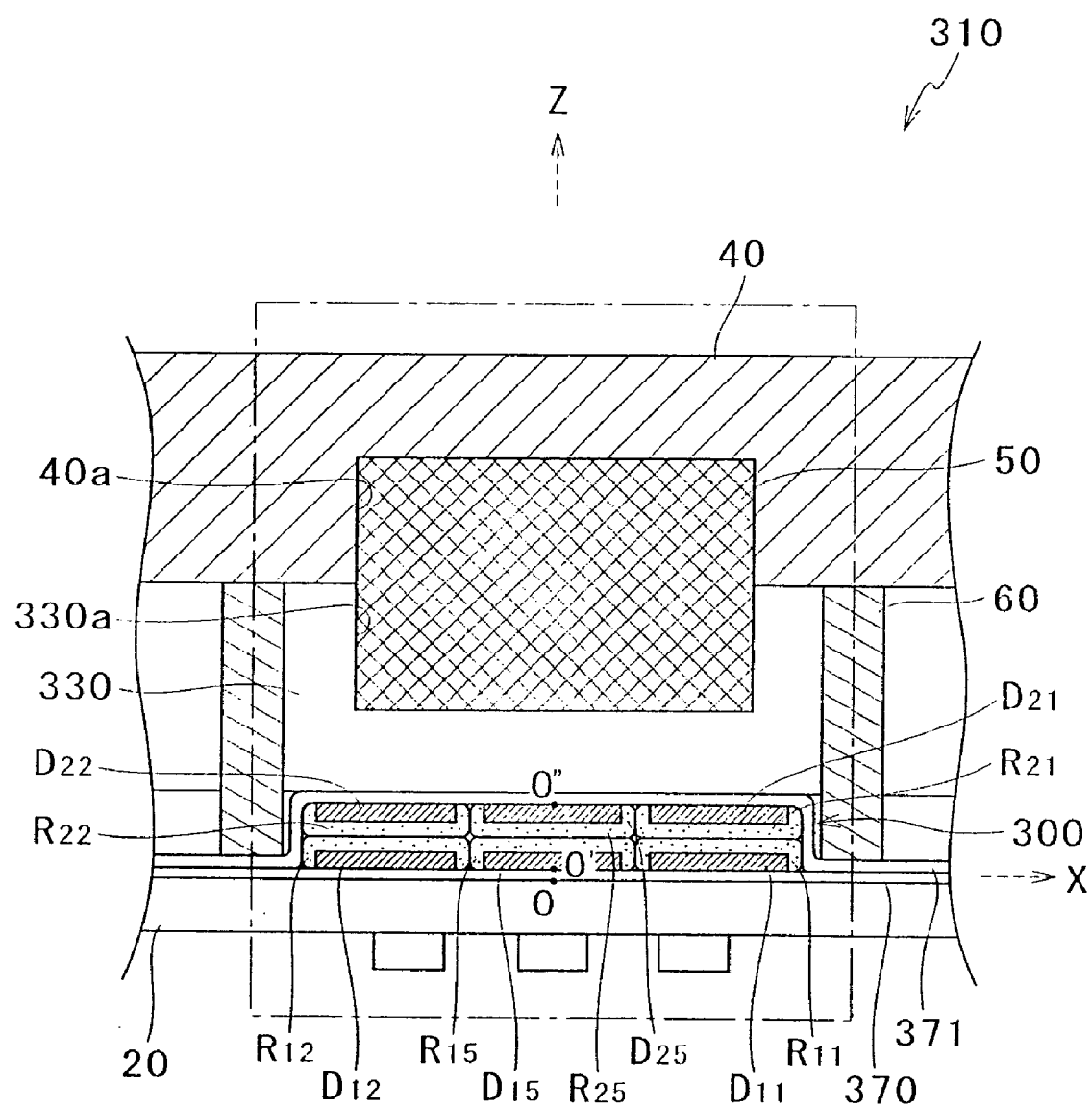
FIG. 13 is a schematic sectional view of a sensor cell included in a sensor sheet according to a second embodiment of the present invention.
Figure 14:
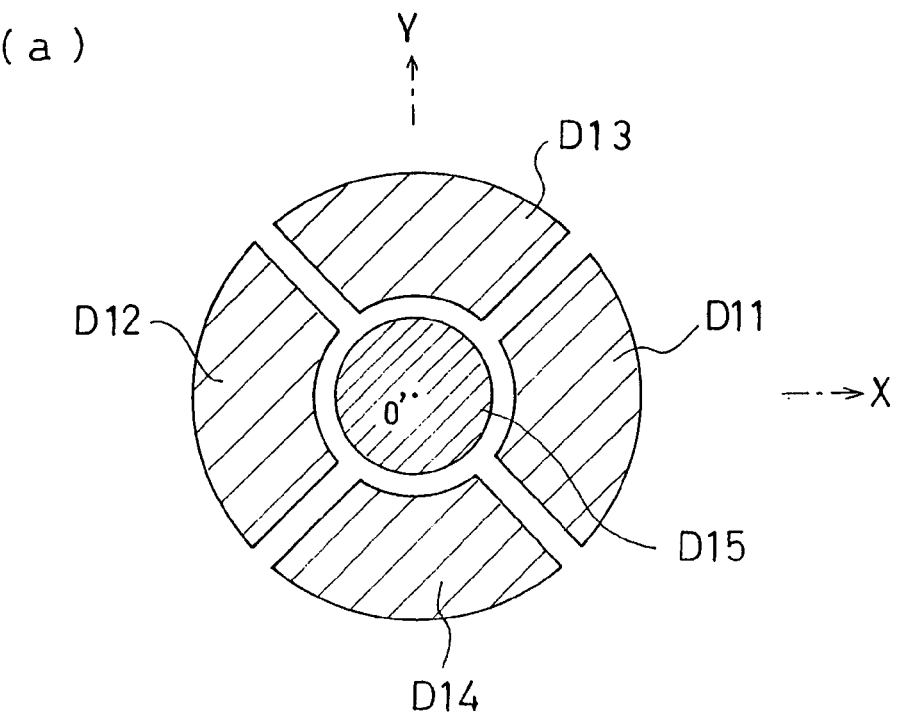
FIG. 14 is a view showing an arrangement of a plurality of electrodes included in the sensor cell of FIG. 13.
Figure 14:
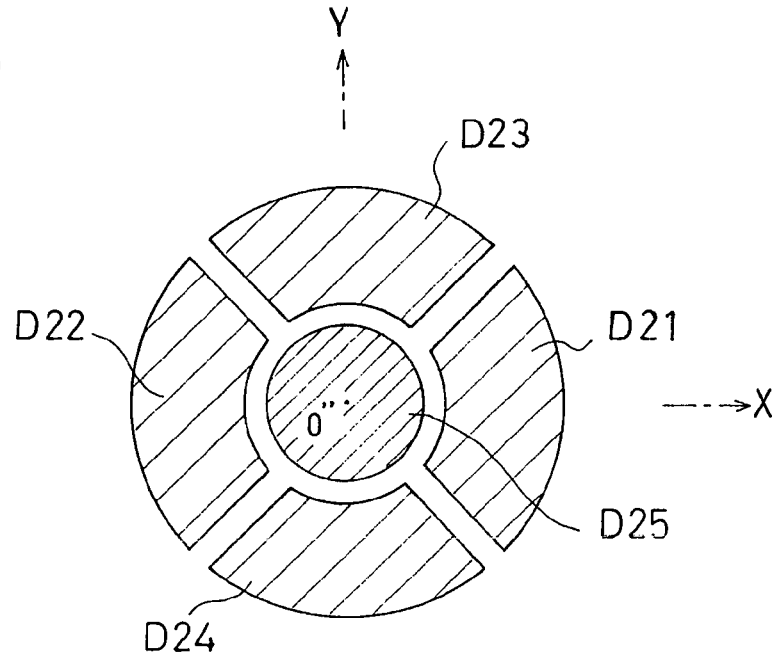
Figure 15:
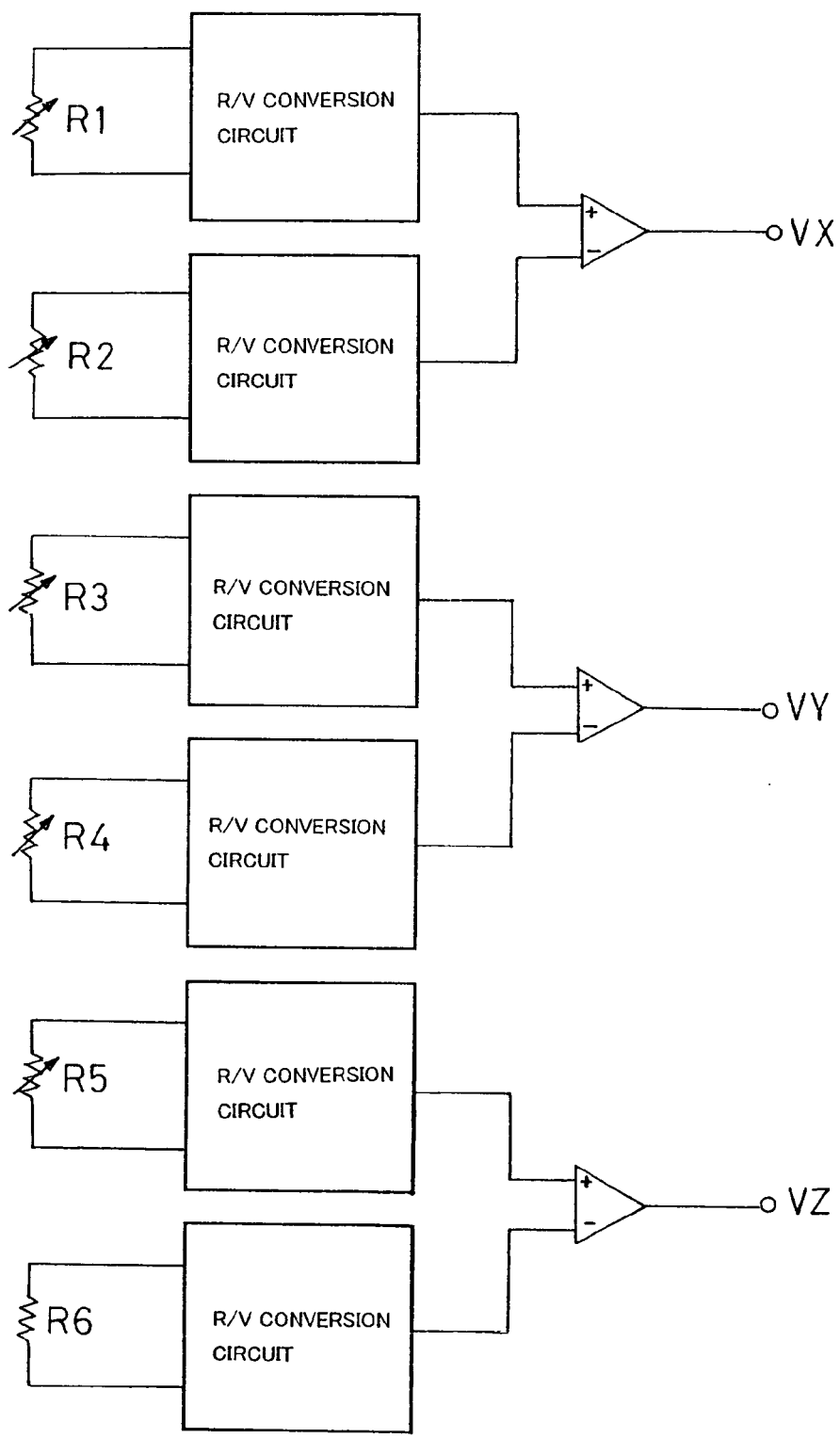
FIG. 15 is a diagrammatic diagram of circuits of the sensor cell shown in FIG. 13.
Figure 16:
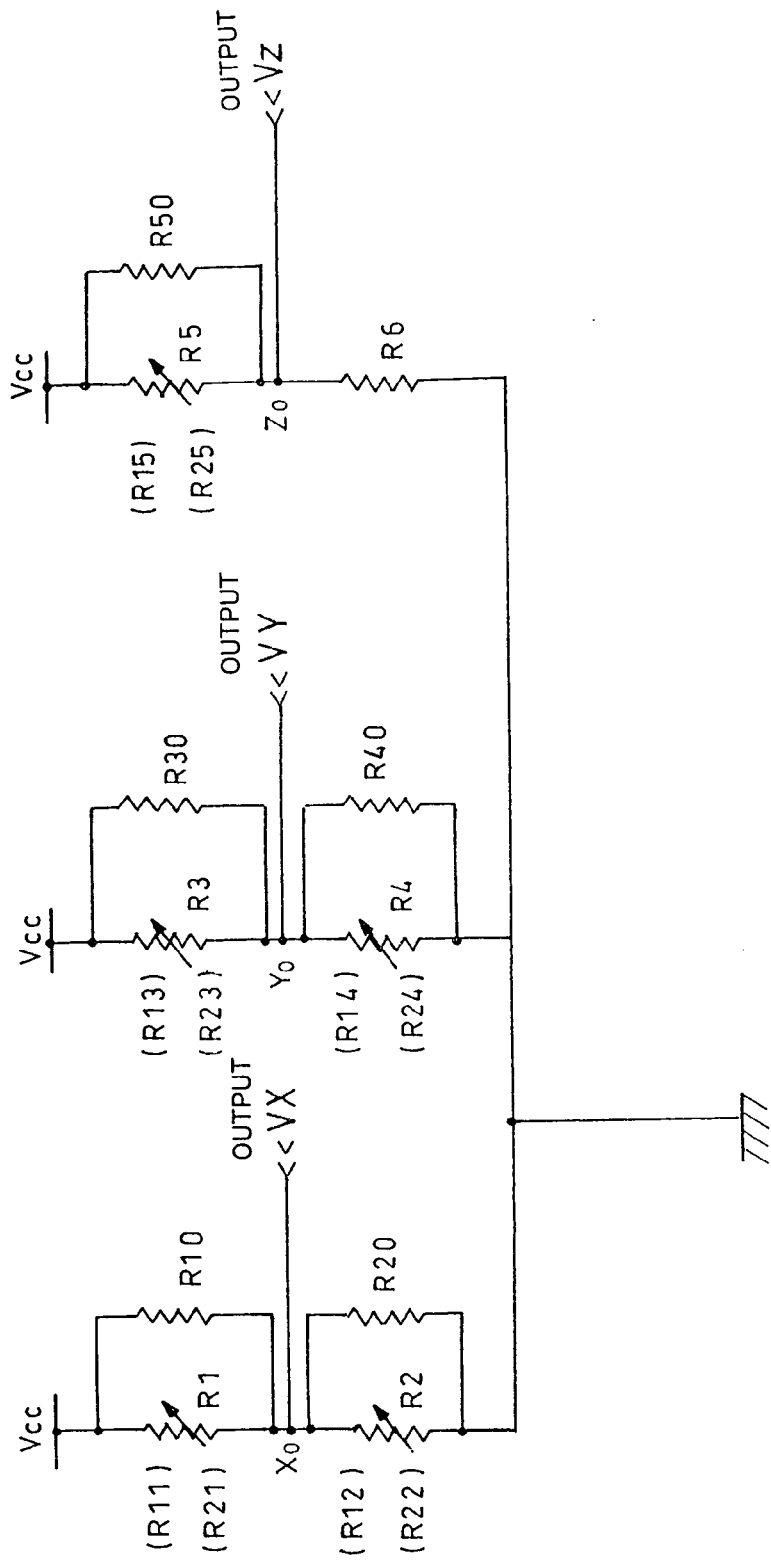
FIG. 16 is an example of a circuit diagram of the sensor cell shown in FIG. 13.

Next, a sensor sheet according to a second embodiment of the present invention will be described with reference to the related drawings. FIG. 13 is a schematic sectional view of a sensor cell included in a sensor sheet according to the second embodiment of the present invention. FIG. 14 is a view showing an arrangement of a plurality of electrodes included in the sensor cell of FIG. 13. FIG. 15 is a diagrammatic diagram of circuits of the sensor cell shown in FIG. 13. FIG. 16 is an example of a circuit diagram of the sensor cell shown in FIG. 13.

A sensor sheet according to the second embodiment significantly differs in construction from the sensor sheet 1 of the first embodiment in that in the sensor sheet 1, each sensor cell 10 includes a capacitance type sensor, one for each sensor cell, whereas in the sensor sheet of the second embodiment, each sensor cell 310 includes a resistance type sensor, one for each sensor cell. Like numerals are given to like parts on the sensor cell 10 of the remaining constructions and the detailed description thereon is omitted. In the sensor sheet of the second embodiment of this embodiment as well, a large number of sensor cells 310 are arranged in matrix.

The sensor cell 310 of this embodiment has a support body 330 supported by the supporting member 60. A predetermined space is formed between the substrate 20 and the support body 330. A sensor unit 300 is arranged between the substrate 20 and the support body 330. The core 50 is arranged between the cover layer 40 and the supporting member 330. The supporting member 330 is formed of material having elasticity such as silicon rubber. The core 50 is surrounded by the recess 330a formed in an upper surface of the supporting member 330 and the recess 40a formed in the cover layer 40, as is the case with the first embodiment.

The sensor unit 300 has two laminated film members 370, 371. The film members 370, 371 each comprise a PET film or a like film, for example. Conductive lands D11–D15 and D21–D25 and pressure-sensitive resistance inks R11–R15 and R21–R25 are provided between the film member 370 and the film member 371. Also, the sensor unit 300 is arranged with its lower surface (a lower surface of film member 370) contacting with a front surface of the substrate 20 and its upper surface (an upper surface of the film member 371) contacting with the lower surface of the supporting member 330.

A circular conductive land D15 with center at the origin O' (an intersecting point of the upper surface of the film member 370 and the Z-axis) and conductive lands D11–D14 of a general sector form positioned outside of the conductive land D15 are formed on the upper surface of the film member 370 (a bonded surface of the film member 370 to the film member 371) in a screen printing using conductive ink using e.g. silver or carbon as raw material, as shown in FIG. 14(a). Also, the pressure-sensitive resistance inks R11–R15 are screen-printed on the conductive lands D11–D15 in such a manner as to superimpose themselves on the conductive lands D11–D15.

Similarly, a circular conductive land D25 with center at the origin O'' (an intersecting point of the lower surface of the film member 371 and the Z-axis) and conductive lands D21–D24 of a general sector form positioned outside of the conductive land D25 are formed on the lower surface of the film member 371 (a bonded surface of the film member 371 to the film member 370) in a screen printing using conductive ink using e.g. silver or carbon as raw material, as shown in FIG. 14(b). Also, the pressure-sensitive resistance inks R21–R25 are screen-printed on the conductive lands D21–D25 in such a manner as to superimpose themselves on the conductive lands D21–D25.

The pressure-sensitive resistance inks R11–R15 and R21–R25 are members whose resistance values vary depending on the pressure applied or the contact area. The pressure-sensitive resistance inks R11–R14 and R21–R25 may be prepared, for example, by mixing conductive ink containing graphite, polyvinyl resin and butyl cellosolve acetate into insulating ink containing a filling agent of titanium dioxide, a binding agent of polyvinyl resin, and a solvent of butyl cellosolve acetate. The resistance value of the pressure-sensitive resistance ink may be easily changed by changing a relative proportion between the insulating component and the conductive component which are main components of the pressure-sensitive resistance ink.

The pressure-sensitive resistance ink R11 (the conductive land D11) and the pressure-sensitive resistance ink R21 (the conductive land D21) are opposite to each other and are arranged to correspond to the X-axis positive direction. The pressure-sensitive resistance ink R12 (the conductive land D12) and the pressure-sensitive resistance ink R22 (the conductive land D22) are opposite to each other and are arranged to correspond to the X-axis negative direction. Similarly, the pressure-sensitive resistance ink R13 (the conductive land D13) and the pressure-sensitive resistance ink R23 (the conductive land D23) are opposite to each other and are arranged to correspond to the Y-axis positive direction, and the pressure-sensitive resistance ink R14 (the conductive land D14) and the pressure-sensitive resistance ink R24 (the conductive land D24) are opposite to each other and are arranged to correspond to the Y-axis negative direction. Also, the pressure-sensitive resistance ink R15 (the conductive land D15) and the pressure-sensitive resistance ink R25 (the conductive land D25) are opposite to each other and are arranged to correspond to the Z-axis direction. The pressure-sensitive resistance inks (the conductive lands) which are opposite to each other, as mentioned above, have substantially the same size.

In the sensor unit 300, a circuit pattern (wiring) and a conductive layer of connector terminal as well as the conductive lands D11–D15, D21–D25 are formed between the film members 370, 371, though not shown in FIG. 13. As mentioned later, the conductive lands D11–D15, D21–25 are connected to the sensor circuits and the like through the circuit pattern and the terminal.

In the sensor cell 310, the conductive lands D11 and D21 are disposed to correspond to the X-axis positive direction and the conductive lands D12 and D22 are disposed to correspond to the X-axis negative direction, so that they are used to detect the X-axis direction components of the force applied from outside. Also, the conductive lands D13 and D23 are disposed to correspond to the Y-axis positive direction and the conductive lands D14 and D24 are disposed to correspond to the Y-axis negative direction, so that they are used to detect the Y-axis direction components of the force applied from outside. Also, the pair of conductive lands D11, D21 and the pair of conductive lands D12, D22 are spaced apart in the X-axis direction and are disposed symmetrically with respect to the Y-axis. The pair of conductive lands D13, D23 and the pair of conductive lands D14, D24 are spaced apart in the Y-axis direction and are disposed symmetrically with respect to the X-axis.

Next, the circuitry of the sensor cell 310 will be described with reference to FIGS. 15 and 16.

In the sensor cell 310, the pressure-sensitive resistance inks R11–R15 and the pressure-sensitive resistance inks R21–R25 opposite to them form variable contact resistances R1–R5, respectively. By reading the signals output from the respective R/V conversion circuits connected to the variable contact resistances R1, R2 by an exclusive-OR gate, a differential amplification circuit or the like, the output Vx is derived, as shown in FIG. 15. Similarly, by reading the signals output from the respective R/V conversion circuits connected to the variable contact resistances R3, R4 by the exclusive-OR gate, the differential amplification circuit or the like, the output Vy is derived. Also, by reading the signals output from the respective R/V conversion circuits connected to the variable contact resistance R5 and a fixed resistance R6 by the exclusive-OR gate, the differential amplification circuit or the like, the output Vz is derived.

The outputs (analog voltage) corresponding to the X-axis direction, the Y-axis direction and the Z-axis direction can be obtained on the basis of the resistance values of the variable contact resistances R1–R5 that vary in accordance with the direction and magnitude of the force applied from outside.

In the circuit diagram of the sensor cell 310 shown in FIG. 16, one end of the variable contact resistance R1 and one end of the variable contact resistance R2 are connected to each other. The other end of the variable contact resistance R1 is held at a power-supply voltage Vcc and the other end of the variable contact resistance R2 is connected to ground. Similarly, one end of the variable contact resistance R3 and one end of the variable contact resistance R4 are connected to each other. The other end of the variable contact resistance R3 is held at the power-supply voltage Vcc and the other end of the variable contact resistance R4 is connected to ground. Also, one end of the variable contact resistance R5 and one end of the fixed resistance R6 are connected to each other. The other end of the variable contact resistance R5 is held at the power-supply voltage Vcc and the other end of the fixed resistance R6 is connected to ground.

Also, the variable contact resistance R1 is connected to a fixed resistance R10 at one end thereof and the other end thereof. Similarly, the variable contact resistances R2, R3, R4, R5 are connected to their respective fixed resistances R20, R30, R40, R50 at one end thereof and the other end thereof. The fixed resistances R10, R20, R30, R40, R50 are fixed resistances having a certain resistance value to allow the output of the analog voltages corresponding to the X-axis, the Y-axis and the Z-axis even when the pair of pressure-sensitive pressure inks forming the variable contact resistances R1–R5 are put in a similar state to a separated state to cause infinite increase of the resistance value.

In the circuit diagram of FIG. 16, the output Vx from a node X0 between the variable contact resistance R1 and the variable contact resistance R2, the output Vy from a node Y0 between the variable contact resistance R3 and the variable contact resistance R4, and the output Vz from a node Z0 between the variable contact resistance R5 and the fixed resistance R6 are derived from the following equations, respectively. The node X0 is also a node between the fixed resistance R10 and the fixed resistance R20. Similarly, the node Y0 is also a node between the fixed resistance R30 and the fixed resistance R40. Also, the node Z0 is also a node between the fixed resistance R50 and the fixed resistance R6.

[Equation 1]

As described above, in the sensor sheet according to this embodiment, each sensor cell 310 can detect the X-axis direction component, the Y-axis direction component, and the Z-axis direction component of force applied from outside. Thus, the entire sensor sheet can measure a three-dimensional distribution of force applied from outside, including bidirectional components of force, i.e., a component of force vertical to the cover layer 40 and a component of force parallel thereto. This can allow a detailed analysis of the force applied to the sensor sheet.

Also, since the metal core 50 is arranged between the cover layer 40 and the supporting member 330, the force applied from outside can be transmitted to the supporting member 330 efficiently. This can provide the result that particularly when a force is detected by using an inclination of the supporting member 330 to which the force is applied from outside, in other words, when an X-axis direction component of the force is detected on the basis of the displacement of the portions of the supporting members 330 corresponding to the X-axis positive direction and the X-axis negative direction by using difference in amount of variation of resistance values of the variable contact resistances R1, R2 and when a Y-axis direction component of the force is detected on the basis of the displacement of the portions of the supporting members 330 corresponding to the Y-axis positive direction and the Y-axis negative direction by using difference in amount of variation of resistance values of the variable contact resistances R3, R4, the inclination of the supporting member 330 can easily be detected to thereby produce improved accuracy of detection of the sensor cell 310.

Also, since the sensor sheet of this embodiment also has a large number of sensor cells 310 which are arranged in matrix and arranged uniformly over the entire area of the sensor sheet, the distribution of force applied from outside to the sensor sheet can be detected with high accuracy.

In addition, since the cover layer 40 which receives the force applied from outside has the surface flattened not to have any projections and depressions, the distribution of force can be measured under a usual condition, not under any specific condition for the measurement.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

Although the sensor sheet having a large number of sensor cells arranged on a plane (flat) of the sensor sheet has been illustrated in the first embodiment described above, this construction is not limitative. Alternative sensor sheet having a large number of sensor cells arranged along a curvature of a curve, such as a cylindrical shape or a spherical shape, may be used.

Although the sensor sheet having the construction wherein the protrusion of the displacement electrode and the reference electrode are spaced apart from each other when no force is applied from outside has been illustrated in the first embodiment described above, this construction is not limitative. The protrusion of the displacement electrode and the reference electrode may be always in contact with each other so that the displacement electrode may be always kept at a ground potential.

Although the sensor sheet having the core member (core) for causing the displacement electrode or conductive land corresponding to the second electrode to be displaced by the force applied from outside has been illustrated in the first and second embodiments described above, the core is not indispensable. Also, the cover layer as well as the core is not indispensable. That is to say, the displacement electrode or the supporting member may receive the force applied from outside. In this modification, the displacement electrode or the supporting member may be formed to have a flat surface.

Although the sensor sheet having a large number of sensor cells arranged in matrix has been illustrated in the first and second embodiments described above, the arrangement of a large number of sensor cells may be arbitrarily selected, without limiting thereto.

Although the sensor sheet having a sensor capable of recognizing components of the force applied from outside for three different directions has been illustrated in the first and second embodiments described above, this is not limitative. The sensor incorporated in the sensor sheet may be designed to recognize components of the force applied from outside for two different directions.

Although the sensor cell of the sensor sheet having either a capacitance type sensor or a resistance type sensor has been illustrated in the first and second embodiments described above, this is not limitative. Different type of sensors may be used, as long as the sensors (sensor cells) have similar function as those of the embodiments.

Although the signal processing circuit including the EX-OR element has been illustrated in the first embodiment described above, the construction of the signal processing circuit may be arbitrarily modified, without limiting thereto. The signal processing circuit may include any of an OR element used for the logic operation OR, an AND element used for the logic operation AND, and a NAND element used for the logic operation OR and NOT operation, instead of the EX-OR element used for an exclusive-OR operation. In this modification, when parts of the sensor cell are made of material to improve sensitivity, the sensitivity of the sensor sheet may be adjusted (in this case, the sensitivity is reduced) by the construction of the signal processing circuit.

$$VX = \frac{\frac{R2 \cdot R20}{R2 + R20}}{\frac{R1 \cdot R10}{R1 + R10} + \frac{R2 \cdot R20}{R2 + R20}} \times Vcc \qquad \text{Equation 1}$$

$$VY = \frac{\frac{R4 \cdot R40}{R4 + R40}}{\frac{R3 \cdot R30}{R3 + R30} + \frac{R4 \cdot R40}{R4 + R40}} \times Vcc$$

$$VZ = \frac{R6}{\frac{R5 \cdot R50}{R5 + R50} + R6}$$

What is claimed is:

1. A sensor sheet comprising:
a plurality of sensors arranged in a matrix;
an elastic supporting member configured to partition at least two of the plurality of sensors from each other; and
a cover layer configured to cover the plurality of sensors,
wherein at least one of the plurality of sensors comprises:
   a plurality of first electrodes corresponding to a plurality of directions, respectively;
   a second electrode supported by the elastic supporting member and facing the plurality of first electrodes such that capacitance elements are formed by the plurality of first electrodes and the second electrode, wherein the second electrode is configured to be displaceable toward the plurality of first electrodes when an external force is applied thereto; and
   a core member is disposed between the cover layer and the second electrode and formed of rigid material arranged to permit independent movement thereof, wherein the core member is individual to the at least one of the plurality of sensors;
wherein the at least one of the plurality of sensors is capable of identifying the external force in a multidimensional direction based on detection of changes in capacitance of the capacitance elements caused by changes in distances between the plurality of first electrodes and the second electrode, and
wherein distribution of force applied to the cover layer is identified based on the forces identified by at least two of the plurality of the sensors.

2. The sensor sheet according to claim 1, wherein the at least one of the plurality sensors further comprises a third electrode grounded and arranged in a proximity of the first electrodes,
wherein the second electrode contacts the third electrode when the external force is applied thereto, and
wherein a signal is input to the plurality of first electrodes when the second electrode and the third electrode are in contact with each other.

3. The sensor sheet according to claim 1, wherein a surface of the cover layer to receive the external force applied is formed to have substantially no projections and depressions.

4. The sensor sheet according to claim 2, wherein a surface of the cover layer to receive the external force applied is formed to have substantially no projections and depressions.

5. The sensor sheet according to claim 2, wherein the second electrode comprises a protrusion to contact the third electrode.

6. The sensor sheet according to claim 2, wherein the at least one of the plurality of sensors comprises a insulating layer to cover the plurality of the first electrode.

7. The sensor sheet according to claim 2, wherein the changes in capacitance is detected using the signal that is input to the plurality of first electrodes when the second electrode contacts the third electrode.

8. A sensor sheet comprising:
a plurality of sensors arranged in a matrix;
an elastic supporting member configured to partition at least two of the plurality of sensors from each other; and
a cover layer configured to cover the plurality of sensors,
wherein at least one of the plurality of sensors comprises:
   a plurality of first electrodes corresponding to a plurality of directions, respectively;
   a second electrode supported by the elastic supporting member and facing the plurality of first electrodes and configured to be displaceable toward the plurality of first electrodes when an external force is applied thereto;
   a pressure-sensitive resistance member arranged between the plurality of first electrodes and the second electrode; and
   a core member is disposed between the cover layer and the second electrode and formed of rigid material arranged to permit independent movement thereof, wherein the core member is individual to the at least one of the plurality of sensors;
wherein the at least one of the plurality of sensors is capable of identifying the external force in a multidimensional direction based on detection of changes in resistance between the plurality of first electrodes and the second electrode, and
wherein distribution of force applied to the cover layer is identified based on the forces identified by at least two of the plurality of the sensors.

9. The sensor sheet according to claim 8, wherein a surface of the cover layer to receive the external force applied is formed to have substantially no projections and depressions.

* * * * *